(12) United States Patent
Zatepyakin et al.

(10) Patent No.: US 10,599,916 B2
(45) Date of Patent: Mar. 24, 2020

(54) METHODS AND SYSTEMS FOR PLAYING MUSICAL ELEMENTS BASED ON A TRACKED FACE OR FACIAL FEATURE

(71) Applicant: Facebook, Inc., Menlo Park, CA (US)

(72) Inventors: Evgeny Zatepyakin, London (GB); Yauheni Neuhen, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 15/810,536

(22) Filed: Nov. 13, 2017

(65) Prior Publication Data

US 2019/0147229 A1    May 16, 2019

(51) Int. Cl.
| | |
|---|---|
| *G06F 3/00* | (2006.01) |
| *G06K 9/00* | (2006.01) |
| *G10H 1/36* | (2006.01) |
| *G11B 27/031* | (2006.01) |
| *G06T 7/73* | (2017.01) |
| *G06T 7/246* | (2017.01) |

(52) U.S. Cl.
CPC ..... *G06K 9/00315* (2013.01); *G06K 9/00248* (2013.01); *G06K 9/00281* (2013.01); *G06K 9/00335* (2013.01); *G06K 9/00744* (2013.01); *G10H 1/368* (2013.01); *G11B 27/031* (2013.01); *G06K 2009/00738* (2013.01); *G06T 7/246* (2017.01); *G06T 7/73* (2017.01); *G06T 2207/10016* (2013.01); *G06T 2207/30201* (2013.01); *G10H 2210/005* (2013.01); *G10H 2220/455* (2013.01)

(58) Field of Classification Search
CPC ................ G06K 9/00; G06T 7/00; G06F 3/00
USPC .......................................................... 382/103
See application file for complete search history.

(56) References Cited

U.S. PATENT DOCUMENTS

| | | | |
|---|---|---|---|
| 6,514,083 B1 | 2/2003 | Kumar et al. | |
| 6,692,259 B2 | 2/2004 | Kumar et al. | |
| 7,027,054 B1 | 4/2006 | Cheiky et al. | |
| 7,053,915 B1 * | 5/2006 | Jung .................... | G10H 1/368 345/629 |
| 7,889,886 B2 * | 2/2011 | Matsugu ............... | G03B 17/16 348/155 |
| 9,041,784 B2 | 5/2015 | Rivera et al. | |
| 9,064,484 B1 | 6/2015 | Jaaskelainen et al. | |
| 9,256,284 B2 | 2/2016 | Hanaya et al. | |

(Continued)

*Primary Examiner* — Abolfazl Tabatabai

(57) ABSTRACT

Exemplary embodiments relate to applications for facial recognition technology and facial overlays to provide gesture-based music track generation. Facial detection technology may be used to analyze a video, to detect a face, and to track the face as a whole (and/or individual features of the face). The features may include, e.g., the locations of the mouth, direction of the eyes, whether the user is blinking, the location of the head in three dimensional space, the movement of the head, etc. Expressions and emotions may also be tracked. Features/expressions/emotions meeting certain conditions may trigger an event, where events may cause a predetermined musical element to play (e.g., drum beat, piano note, guitar chord, etc.). The sum total of the musical elements played may result in the creation of a musical track. The application of events may be balanced based on musical metrics in order to provide a fluent sound.

18 Claims, 17 Drawing Sheets

(56) References Cited

U.S. PATENT DOCUMENTS

| | | |
|---|---|---|
| 9,324,064 B2 | 4/2016 | Rivera et al. |
| 9,792,954 B2 | 10/2017 | Hanaya et al. |
| 9,959,012 B2 | 5/2018 | Rivera et al. |
| 9,990,615 B2 | 6/2018 | Rivera et al. |
| 2003/0124499 A1 | 7/2003 | Kumar et al. |
| 2007/0258656 A1 | 11/2007 | Aarabi |
| 2008/0267443 A1 | 10/2008 | Aarabi |
| 2010/0141679 A1 | 6/2010 | Lee |
| 2010/0209069 A1 | 8/2010 | Fountaine |
| 2010/0209073 A1 | 8/2010 | Fountaine |
| 2010/0254594 A1 | 10/2010 | Wang et al. |
| 2012/0299945 A1 | 11/2012 | Aarabi |
| 2013/0070093 A1 | 3/2013 | Rivera et al. |
| 2014/0053217 A1 | 2/2014 | Rivera et al. |
| 2014/0081797 A1 | 3/2014 | Rivera et al. |
| 2014/0186002 A1 | 7/2014 | Hanaya et al. |
| 2015/0037777 A1 | 2/2015 | Kushner |
| 2015/0189397 A1 | 7/2015 | Rivera et al. |
| 2015/0227905 A1 | 8/2015 | Rivera et al. |
| 2015/0302239 A1 | 10/2015 | Ohba et al. |
| 2016/0155474 A1 | 6/2016 | Hanaya et al. |
| 2017/0193280 A1 | 7/2017 | Huang et al. |
| 2018/0075317 A1 | 3/2018 | Gomez et al. |

\* cited by examiner

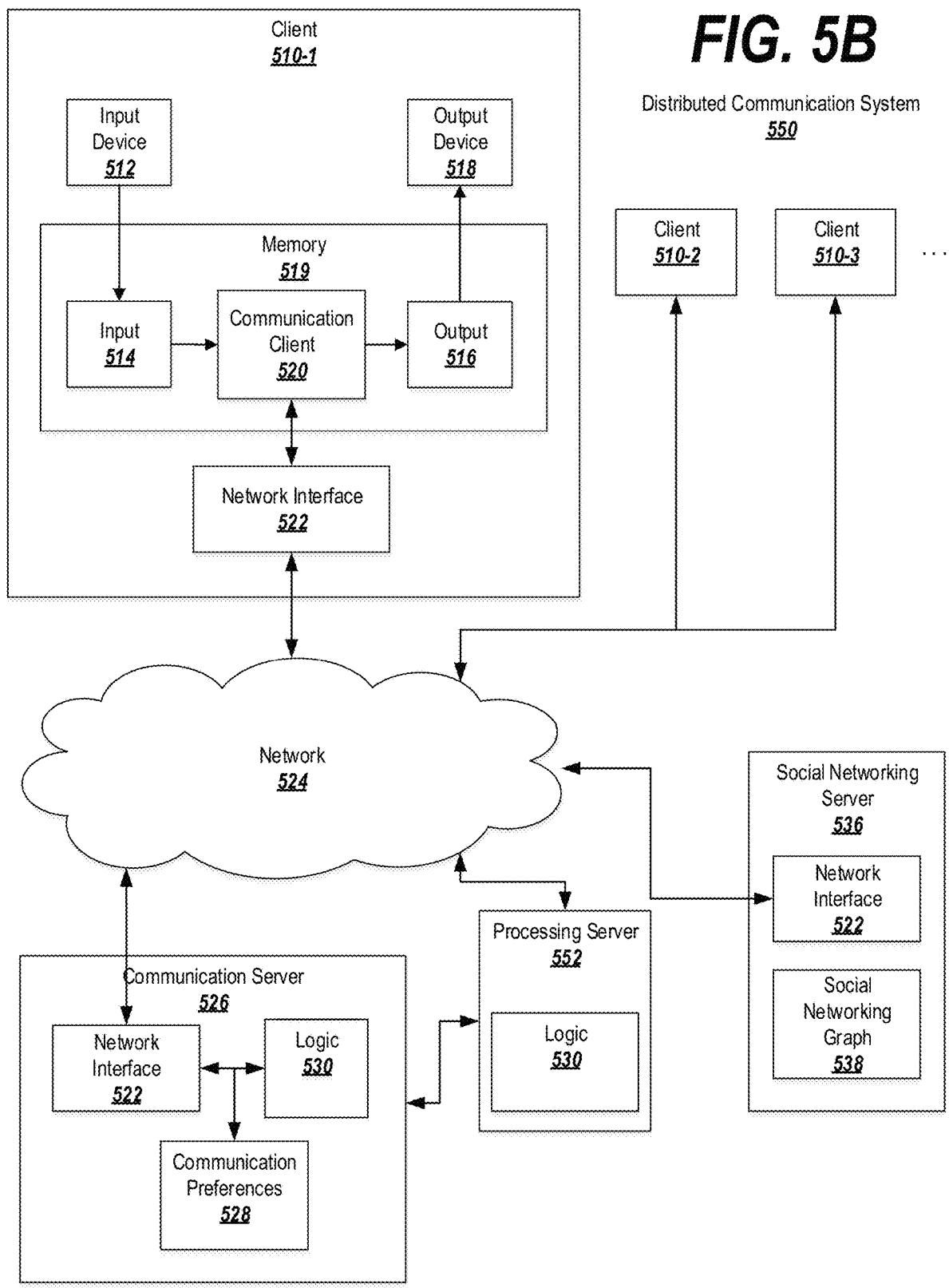

METHODS AND SYSTEMS FOR PLAYING MUSICAL ELEMENTS BASED ON A TRACKED FACE OR FACIAL FEATURE

BACKGROUND

Facial detection technology allows for the detection of a face in a photo or video, and in some cases allows for individuals to be identified based on their facial characteristics. Recently, facial detection techniques have been used to apply overlays on faces, such as by adding a graphical mask over a face in a video.

BRIEF DESCRIPTION OF THE DRAWINGS

FIG. 5B is a block diagram providing an overview of a system including an exemplary distributed communications service;

DETAILED DESCRIPTION

Figure 1A:
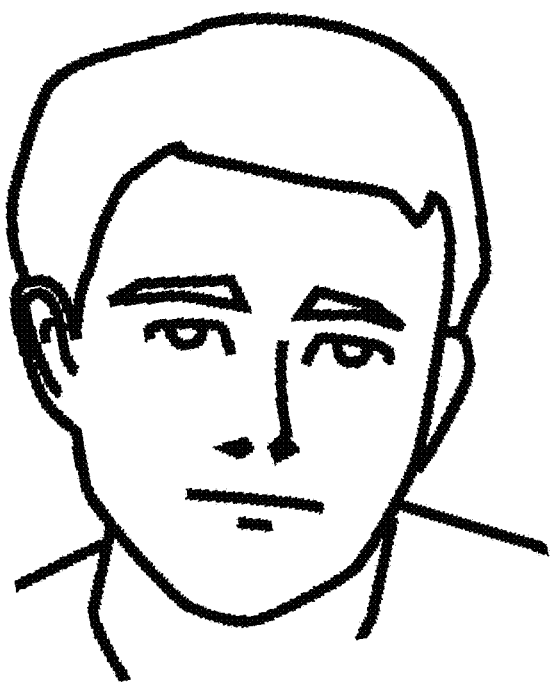
FIG. 1A depicts an exemplary facial overlay to be applied to a face of a user.

Exemplary embodiments addresses the application of facial recognition technology and facial overlays to provide music-themed experiences. According to some embodiments, facial overlays may be leveraged to provide an immersive karaoke experience. For example, a celebrity, music performer, or other person may be mapped to an image or mask and to a set of predefined music tracks configured for karaoke. The image or mask and the music tracks may be stored in a karaoke data structure or element. The karaoke element may further include, for example, metadata with lyrics or other karaoke information.

While performing karaoke to the music tracks, video recording of a user may be generated. The image or mask may be mapped to the users' face in order to give the appearance that the user is performing the music track as the celebrity, performer, or other person.

The music tracks may also be mapped to media elements, which may be interactive (e.g., a disco ball for a disco song, a beach ball for beach rock, etc.). Other items, such as metadata about the music track (e.g., song name, album name, performer name, song facts, etc) may also be stored with the karaoke element and may be displayed in connection with the karaoke performance.

The karaoke experience may be gamified, such as by performing a sound analysis to determine how close the user is to the lyrics or pitch of the singer. The song may be performed live, and a leaderboard may be used to track performance across multiple users. The leaderboard score for each user may be partially based on engagement (likes, comments, etc.) of a user base with the live broadcast.

Further embodiments, which may be used separately or in conjunction with the embodiments described above, address techniques for generating a music track using facial gestures. Facial detection technology may analyze a video to detect a face and track the face as a whole and/or features of the face.

For example, the features may include the locations of the mouth, direction of the eyes, whether the user is blinking, etc. When tracking the entire face, feature information may include the location of the head in 3D space, the movement of the head, etc. Expressions and emotions may also be tracked.

Features/expressions/emotions meeting certain conditions may trigger an event, where events may cause a predetermined musical element to play (e.g., drum beat, piano note, guitar chord, etc.). The sum total of the musical elements played may result in the creation of a musical track.

The application of events may be balanced based on musical metrics in order to provide a fluent sound.

This brief summary is intended to serve as a non-limiting introduction to the concepts discussed in more detail below. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided As an aid to understanding, a series of examples will first be presented before detailed descriptions of the underlying implementations are described. It is noted that these examples are intended to be illustrative only and that the present invention is not limited to the embodiments shown.

Exemplary Interfaces

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

FIG. 1A depicts an exemplary facial overlay 100 to be applied to a face of a user. The facial overlay 100 may be made up of one or more images of a face to be mapped to, and overlaid onto, the face of a user (e.g., in a video communication). In the case of a single facial image making up the overlay, it may be advantageous to utilize a front-facing image (e.g., an image looking as directly as possible into the camera). A user onto whom the overlay 100 is mapped is likely to be interacting with a camera, e.g. in a video call, and hence is likely to be looking directly at the camera. Thus, by using a front-facing image for the overlay, the perspective of the overlay is consistent with the perspective of the user. The perspective of the overlay 100 may nonetheless vary by application; in situations in which the user is expected to be interacting with the camera from a different angle (e.g., from the side), a suitable default overlay perspective may be used.

In the case of multiple images making up the overlay, it may be advantageous to include a front-facing overlay, as well as images taken from other perspectives that are likely to be adopted by the user. For example, during a video call the user may look slightly to the left or the right, may nod their head, or may turn to the side. Including overlay images from each of these perspectives may allow for a more seamless effect. In some cases, when a user transitions from one perspective (e.g., front-facing) to another (e.g., side-facing), overlay information from two or more images may be extrapolated in order to generate perspectives in between these two extremes. For example, if a front-facing overlay image is available and a side-facing overlay image is available, data from both of these overlays may be used to extrapolate appropriate overlay information for mapping the overlay 100 to the user's face when the face is at, e.g., a forty-five degree angle.

Alternatively or in addition, the overlay 100 may represent a three-dimensional model that may be mapped to the user's head. This embodiment has the advantage of allowing for a more seamless overlay even as the user's face moves between many different angles. On the other hand, generating such a model typically requires more a priori work than mapping an image to a face.

Figure 1B:
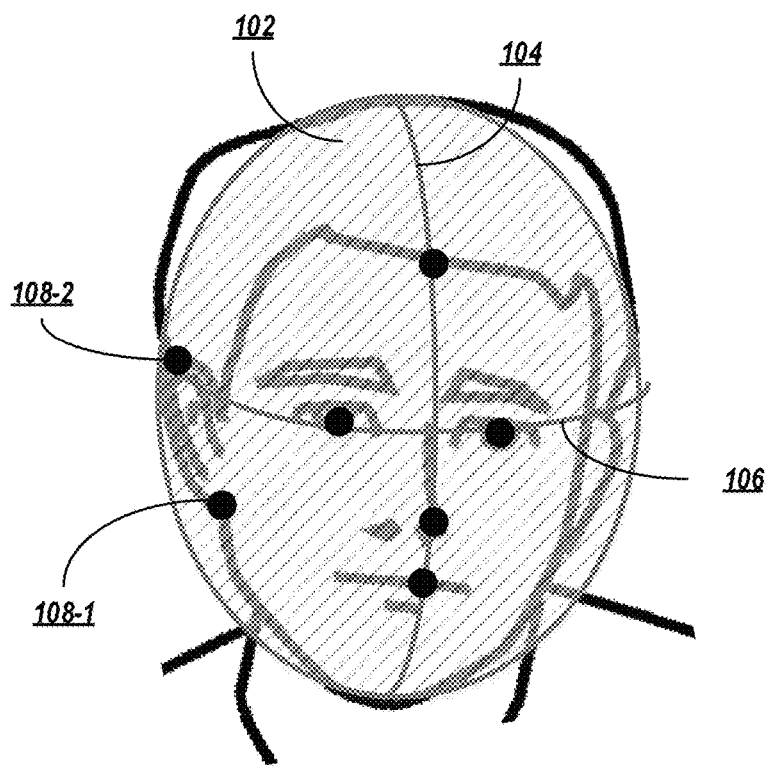
FIG. 1B depicts the facial overlay of FIG. 1A with particular facial features pinpointed.

In addition to the facial image(s) or model(s), the facial overlay 100 may include metadata for facilitating positioning, scaling, etc. the facial overlay 100 onto a video including the face of a user. For example, FIG. 1B depicts several such examples of metadata.

The metadata may include an oval or other shape 102 substantially corresponding to the shape of the face in the overlay 100. A similar shape may be dynamically generated on the face of the user to whom the overlay is to be applied. By matching the shape 102 to the shape overlaid onto the user's face, the overlay 100 may be more readily applied to the user's face in real time. The shape may include axes 104, 106 extending through the center of the face and/or aligning with certain features (e.g., the user's eyes, nose, etc.) The axes may be aligned in real time to similar axes dynamically generated on the face of the user.

The metadata may further include points of reference 108-$i$ on the facial overlay 100. The points of reference 108-$i$ may represent locations of certain features (e.g., top of the ear 108-2, bottom of the ear 108-1, tip of nose, center or edges of mouth, center of brow line, center of eyes etc.) which may be aligned with corresponding points on the face of the user.

Any or all of the metadata may be used to position the overlay on the face of the user in a video, to stretch or scale the overlay 100 or portions of the overlay 100 so that it fits on the user's face (although limits may be enforced to avoid overly distorting the overlay 100), or to extrapolate information to allow the overlay 100 to be applied to the user's face at different angles.

The metadata may be generated automatically (e.g., by algorithmically analyzing the image(s) making up the overlay 100), and/or may be applied manually by a user or administrator.

Figure 1C:
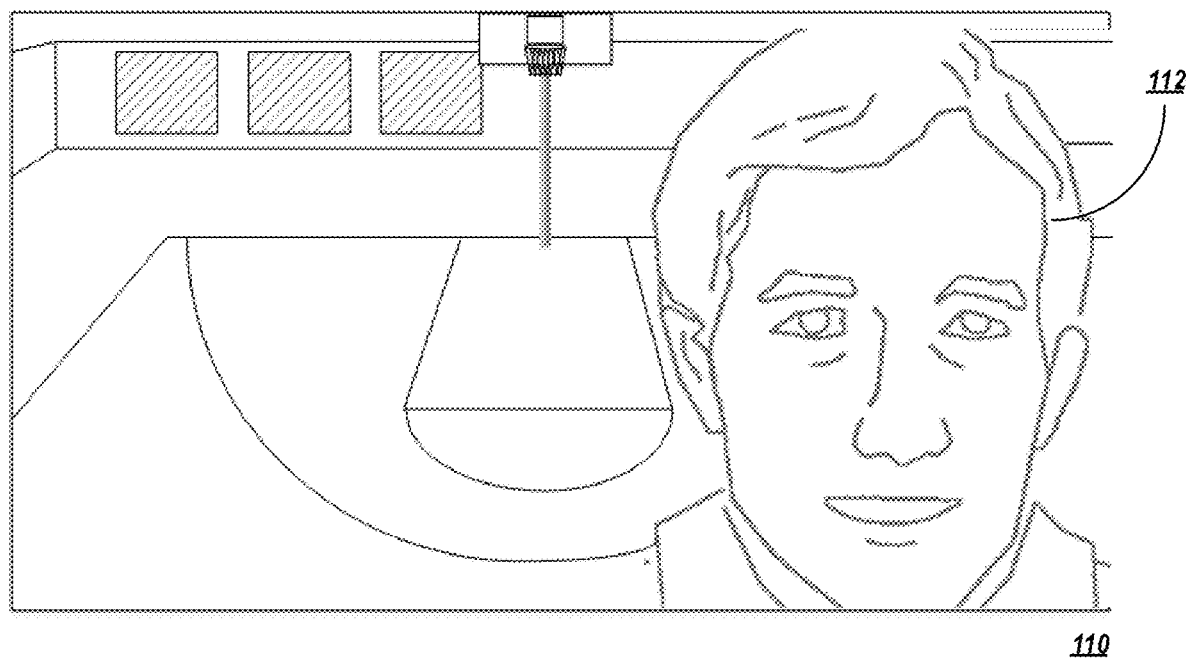
FIG. 1C depicts an exemplary video interface including a face of a user.
Figure 1D:
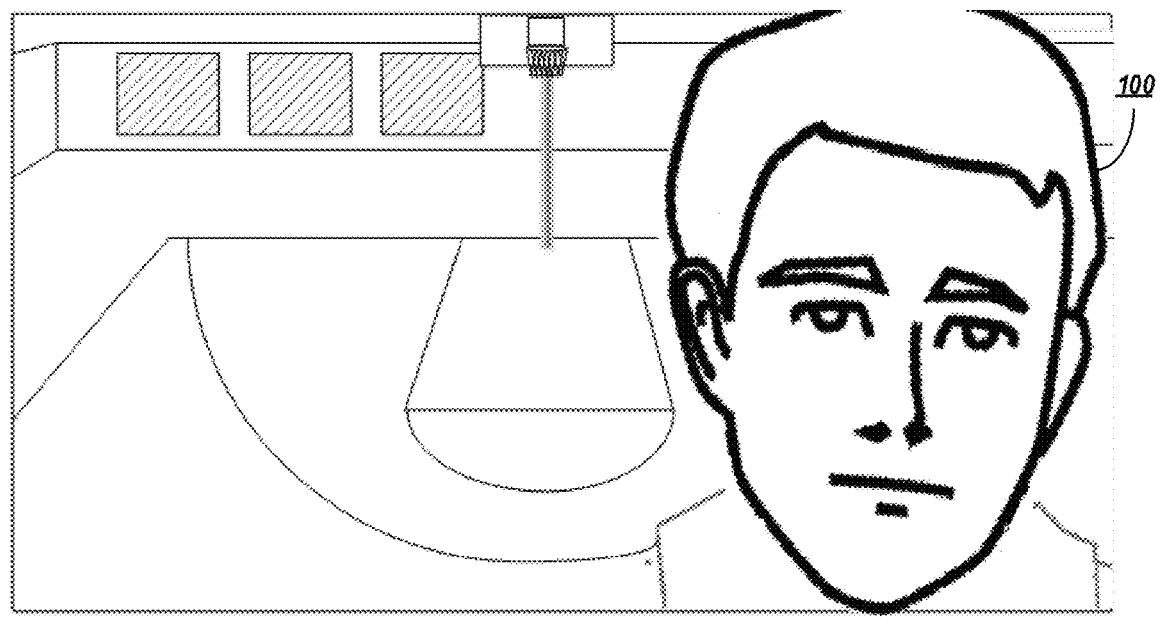
FIG. 1D depicts the facial overlay of FIG. 1A applied to the video interface of FIG. 1C.

The overlay 100 may be applied over the face 112 of a user in a video, such as a prerecorded video, real-time video communication, etc., as shown in FIGS. 1C-1D. FIG. 1C depicts an example of a video interface 110 in which a user's face 112 appears. FIG. 1D depicts the video interface 110 with the overlay 100 overlaid on the user's face.

According to exemplary embodiments, the overlay 100 may represent a celebrity, such as a singer, and may be overlaid onto a user's face as part of a karaoke performance (e.g., a performance of a song associated with the singer). The karaoke performance may be performed in a dedicated karaoke application, or as a secondary feature in another application, such as an application supporting video conversations or other features. The karaoke performance may be conducted in connection with a group video interaction, or may be performed in a solo video performance.

Figure 1E:
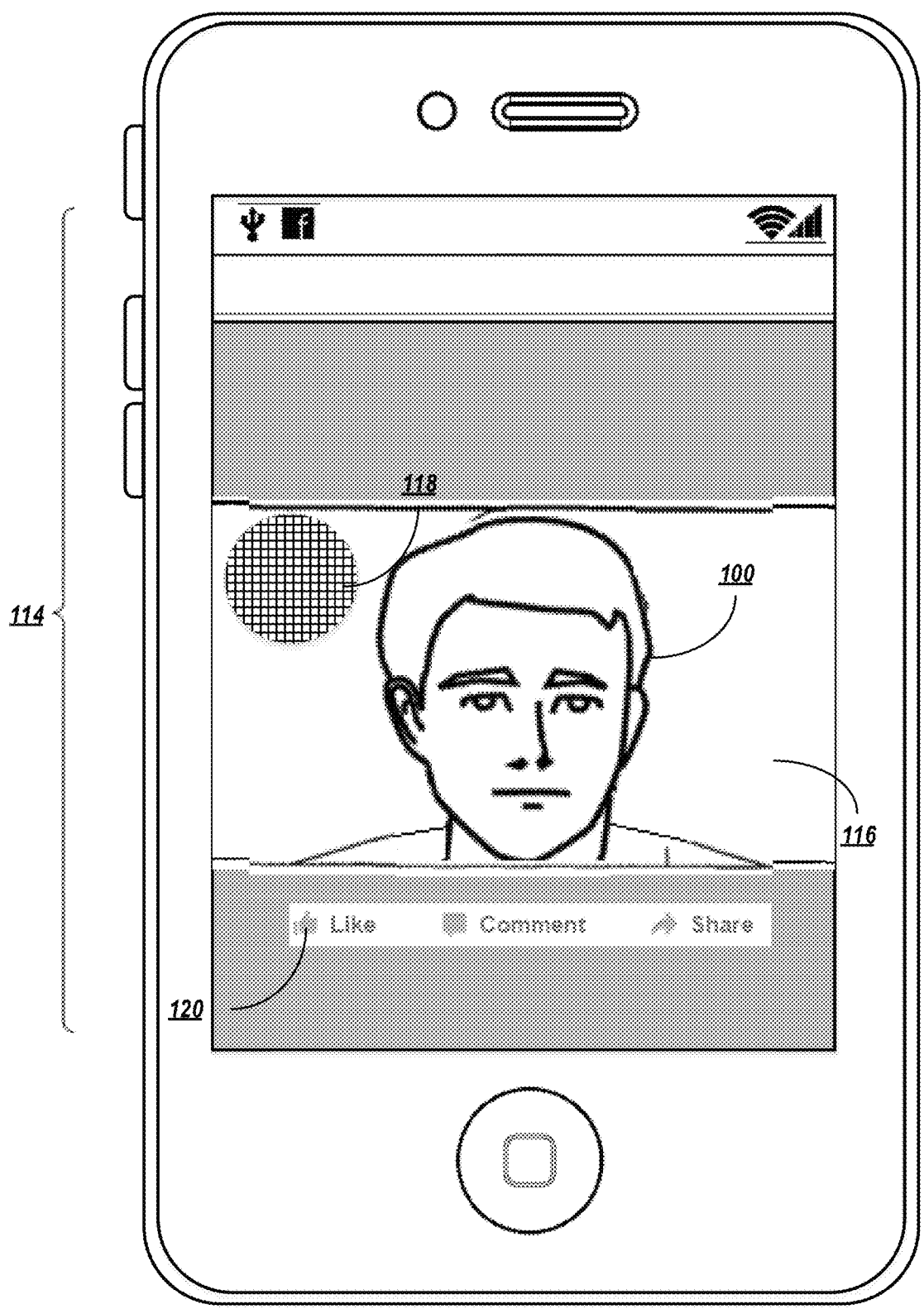
FIG. 1E depicts an exemplary interface for karaoke performance in accordance with an exemplary embodiment.

FIG. 1E depicts an exemplary interface 114 for karaoke performance in accordance with an exemplary embodiment. The interface 114 may be presented as part of a real-time video communication (e.g., a video call), a standalone karaoke application, a social networking site, etc.

Figure 2:
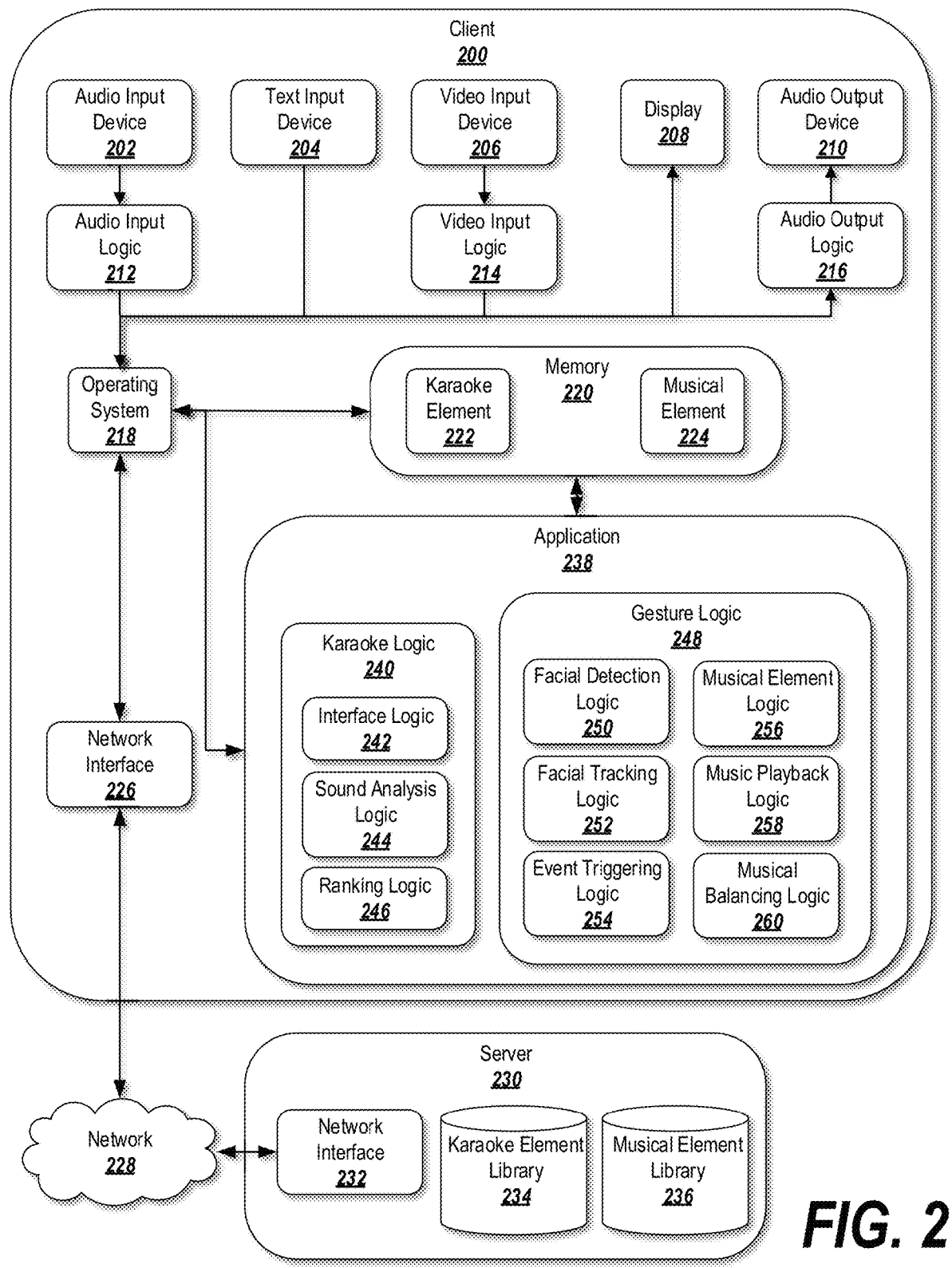
FIG. 2 is a block diagram depicting an exemplary karaoke and music track generation device suitable for use with exemplary embodiments.

The interface 114 may include a video feed 116 in which a user's face is present. Facial recognition/detection logic may analyze the frames of the video feed 116 to identify the location and/or dimensions of the user's face. An overlay 100 may be applied to the user's face. These steps may be performed locally at the user's client device (or at the client device of a recipient of the video), or remotely at a server device. In the former case, the overlay 100 may be applied by a karaoke or communications application that receives a video stream from the client device and applies the overlay using suitable logic; such an example is depicted in FIG. 2. In the latter case, the video stream may be transmitted from a client device to a communications server for distribution to one or more recipients; the overlay 100 may be applied by the communications server or by a different support server.

During the performance, the facial detection logic may identify movement by the features of the user's face, and may alter the overlay 100 accordingly. For instance, when the user opens their mouth, the overlay 100 may be modified so that the mouth on the overlay 100 is also opened to a degree corresponding to the user's. Other features, such as eyes, eyebrows, etc. may also be tracked and reflected on the overlay.

In some embodiments, the device applying the overlay may also or alternatively apply facial detection logic to identify regions of the video feed 116 that do not correspond to the face of the user (e.g., the background of the video) and may replace the regions not corresponding to the face with different items, similar to the effect of a green screen. For example, while performing a karaoke number, the background may be altered to resemble an arena with cheering fans, or with a background thematically appropriate to the song being performed.

In some embodiments, one or more media effects 118 may be applied to the video feed 116. In the example depicted in FIG. 1E, a media effect 118 resembling a disco ball may descend into the video feed 116. The media effect 118 may be present in the video feed at all times, at predefined times, or may appear under predetermined conditions (such as when the user is singing on-key or is the leader on a karaoke leaderboard, as discussed in connection with FIG. 1F).

Data representing the media element 118 may be stored in the video application (e.g., the karaoke or communication application) and/or may be present as a data element in a karaoke data representation including the song, lyrics, artist information, etc.

Other information may also be displayed in the display. For example, the display may include information about the song being performed such as the title, artist, album name, release date, etc. The song's lyrics may be displayed, and certain lyrics may be visually distinguished in time with the progress of the song in order to allow the user to follow along.

The interface 114 may vary depending on the role of the user. For example, the user performing the song may see an interface that includes the song lyrics, whereas the song lyrics may be omitted on the interface of a user who is merely viewing the performance. The viewer may see, for example, certain interaction elements 120 allowing the viewer to engage with the video feed 116 (e.g., by "liking" the feed, commenting on the feed, or sharing the feed with other users).

Figure 1F:
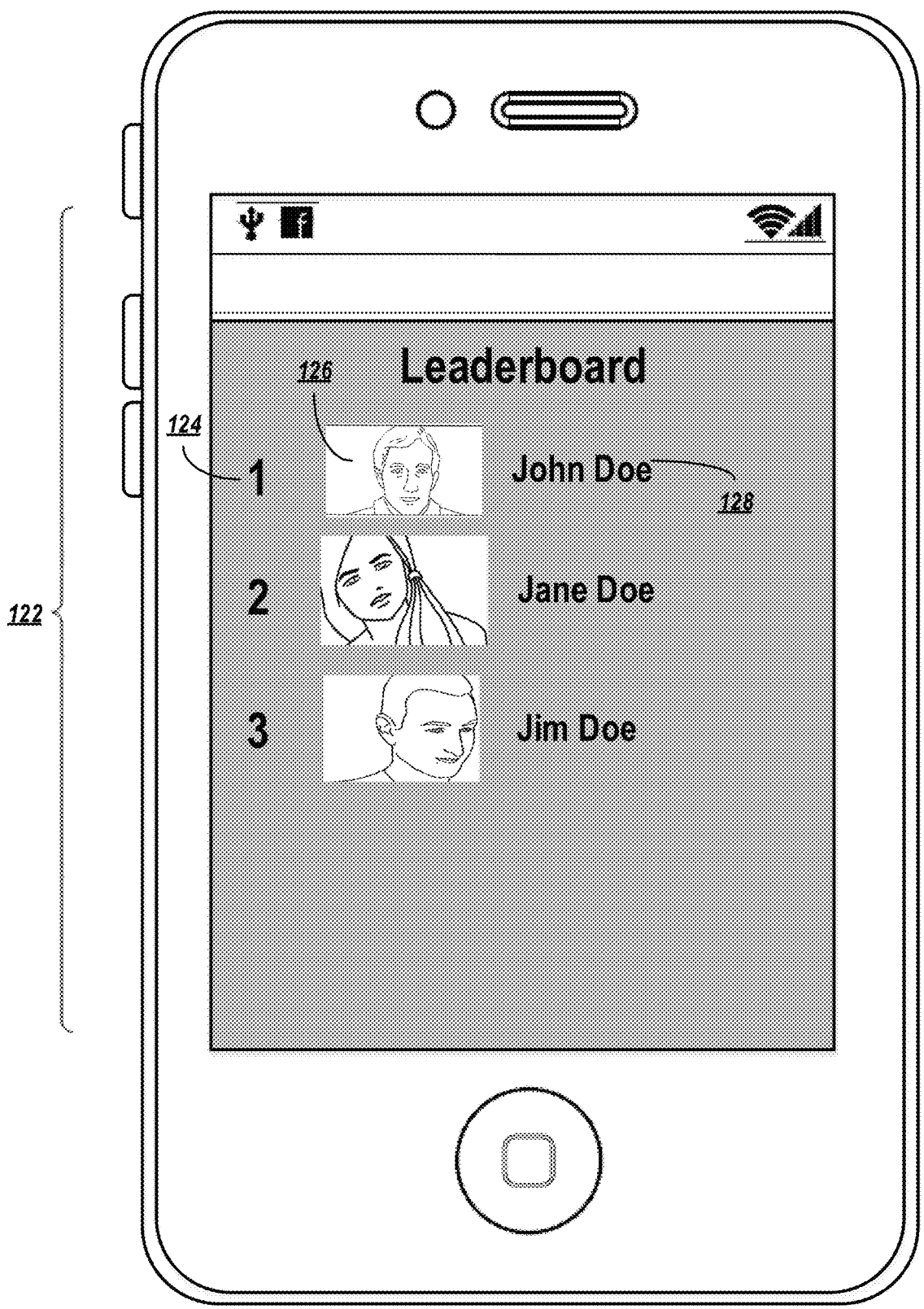
FIG. 1F depicts an exemplary interface for a karaoke leaderboard in accordance with an exemplary embodiment.

Multiple different users may compete against each other in a karaoke competition. The users may perform the same song, or different songs. Various aspects of the karaoke performance may be used to score or rank the performers; the score or rank may be reflected in a leaderboard interface 122 as shown in FIG. 1F.

Each user competing in the completion may be represented in the leaderboard by an avatar or user photo 126. The rank 124 of each user may be displayed along side the photo 126, as well as the user's handle, name 128, or other identifying information. Further information, such as the song performed, a numerical score, etc. may also be displayed.

The rank 124 of each user may be determined based on one of, or a weighted combination of, the accuracy of the user's performance (e.g., whether the user sings the correct lyrics at the correct time, whether the user is on-pitch, etc.) and engagement by the user base with the performer's video feed. Engagement may be based on, for example, how many users view the feed and whether the viewers interact with the feed through the interaction elements 120. Certain types of interactions may be "worth" more to the user's rank than others; for example, "liking" a video feed may carry less weight than commenting on the video feed.

In some embodiments, the overlay 100 may be applied only to the highest-ranking user, or to a predetermined number of highest-ranking users. Thus, the users at the top of the leaderboard may be rewarded for a good performance by appearing to become the singer of the song or another celebrity. Furthermore, users may be rewarded with displayed media elements 118, different backgrounds, etc. In one embodiment, the top-ranking user on the leaderboard at any given moment may receive an overlay 100 corresponding to the singer of the song, whereas a high-ranking subset of users may receive custom backgrounds or media elements. As users' positions on the leaderboard change, these rewards may also change from one user to another.

Figure 1G:
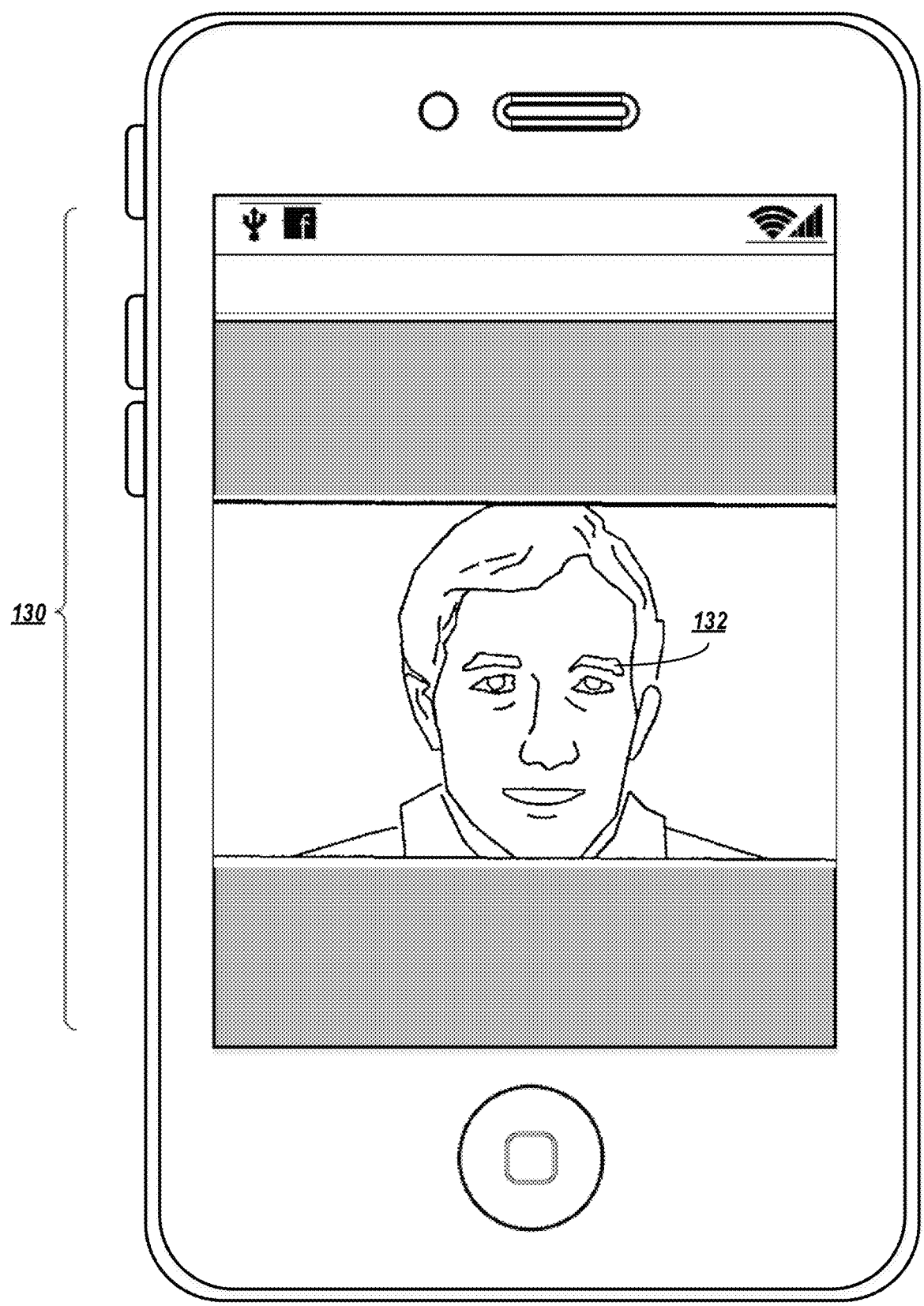
FIG. 1G depicts an exemplary interface at a first time, the interface for tracking a face or a feature of a face for generating a music track.
Figure 1H:
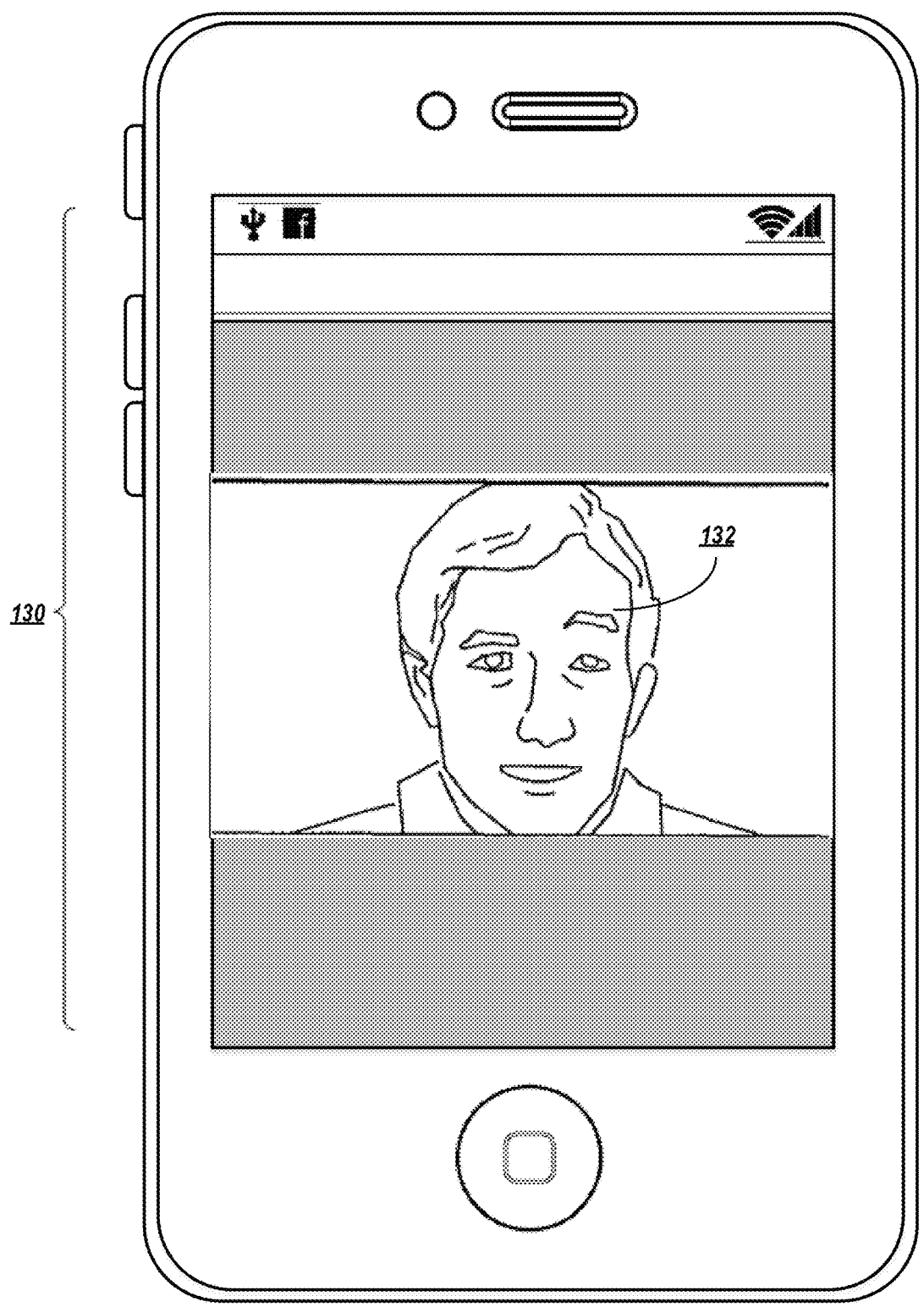
FIG. 1H depicts the exemplary interface of FIG. 1F at a second time.

Alternatively or in addition to displaying a karaoke performance, an interface 130 may be displayed for generating a musical track based on facial features (or an entire face), as shown in FIGS. 1G-1H. In these examples, facial detection technology is also used to detect the location of one or more features of the face, to detect a location of the face in two-dimensional or three-dimensional space, and/or to detect an orientation of the face. As one or more of these elements changes or is held in a predetermined configuration for a period of time, these actions may trigger a musical element to play.

For instance, between FIG. 1G and FIG. 1H, the user raises his eyebrow 132, which is detected as a change in a facial feature. The system may register this change in a facial feature as a triggering event and may look up a triggered action in an element library. For example, the triggered action may be to play a certain type of musical note from a certain type of instrument. The system may also a degree or direction of change in the tracked feature/face and may use this degree or direction of change to affect the triggered note. For example, tilting the head to the left by a small degree may cause the system to play a B on a piano, whereas tilting the head to the left to a larger degree may cause the system to play a G on the piano. Raising the edges of the lips in a smile may cause a snare drum to play, whereas lowering the edges of the lips in a frown may cause a base drum to play. Non-facial gestures may also or alternatively be used to trigger musical sounds.

In some embodiments, the system may record the user's video performance and may associate the triggered sounds with one or more video frames in which the sounds were triggered. Alternatively or in addition, a separate audio-only track may be recorded. The audio and/or video may be stored or uploaded to a server for sharing with other users.

In some cases, it may be desirable to create a coherent "song" using the facial detection technology, with the triggered musical elements falling along a recognizable beat. Or, it may be desirable to at least prevent the user from triggering multiple musical elements too quickly in succession, which could result in a chaotic audio track. Accordingly, in some embodiments the system may consult musical balancing rules that define when musical elements may be played. If the musical balancing rules restrict playing of a musical element, the system may refrain from playing the musical element when triggered. Alternatively or in addition, the system may delay the playing of the musical element until the musical balancing rules identify an appropriate opportunity.

Next, an exemplary configuration for a system for a karaoke performance and/or for generating gesture-based musical tracks is described with reference to FIG. 2.

Exemplary System Configuration

FIG. 2 is a block diagram depicting an exemplary karaoke and music track generation device suitable for use with exemplary embodiments.

A client 200 may be used to record a video and/or play an audio/video feed. The client 200 may be, for example, a computer, a mobile device, a special-purpose karaoke or music generation device, or any other suitable client device.

The client 200 may include an audio input device 202, such as a microphone. The audio input device 202 may record audio in the vicinity of the client device and forward the recorded audio to audio input logic 212 for processing. The audio input logic 212 may process the recorded audio, potentially with the assistance of the sound analysis logic 244 discussed below. The audio input logic 212 may, for example, perform speech-to-text processing, analyze tone and/or pitch in the audio, etc.

The client 200 may further include a text input device 204, such as a physical or on-screen keyboard for entering text.

The client 200 may include a video input device 206, such as a camera capable of recording video. Video input logic 214 may process incoming video, for example to be used by the karaoke logic 240 and/or the gesture logic 248.

The client 200 may include a display 208, such as a touch screen or other display device. The display 208 may display a karaoke interface, leaderboard, and/or music generation interface, as depicted in FIGS. 1A-1H.

The client 200 may include an audio output device 210, such as a speaker or audio output jack. The audio output device 210 may play a karaoke track and/or triggered musical elements. The audio output device 210 may receive the audio through audio output logic 216, which may work in conjunction with the operating system 218 and/or an application 238 to provide a karaoke and/or gesture-based music experience.

Any or all of the audio input device 202, the text input device 204, the video input device 206, the display 208, and the audio output device 210 may be integrated with the client 200, or may be provided externally to the client 200 and connected to the client 200 in a wired or wireless manner. These devices may also be used to support a communications application, such as an application for making video calls or a social networking application.

An operating system 218 may support the client 200, and may coordinate and/or control the audio input device 200, the text input device 204, the video input device 206, the display 208, the audio output device 210, a memory 220, an application 238, and/or a network interface 226.

The memory 220 (e.g., RAM, ROM, etc.) may store data structures for use by the application 238 and/or the operating system 218.

For example, the memory 220 may store a karaoke element 222 (e.g., retrieved from a remote karaoke element library 234) that stores the information used to process a karaoke performance. The karaoke element 222 is described in more detail in connection with FIG. 3A.

The memory 220 may also store a musical element 224 (e.g., retrieved from a remote musical element library 236) that stores information used to generate a gesture-based music track. The musical element 224 is described in more detail in connection with FIG. 3B.

The client 200 may execute an application 238 capable of processing a karaoke performance and/or generating a gesture-based music track. These capabilities may also be split between multiple applications 238. The application 238 may be a special-purpose karaoke or music-generation application, or may be a communication, social networking, or other type of application that incorporates karaoke and gesture-based music capabilities.

The application 238 may support karaoke logic 240 capable of processing, analyzing, and displaying a karaoke performance. For example, the karaoke logic 240 may support interface logic 242 configured to generate a karaoke interface, such as the interface depicted in FIG. 1E. The karaoke interface may cause the display 208 to display a rendering of a facial overlay mapped to the face of the user during the karaoke performance, as described above.

The interface logic may further generate a leaderboard interface, such as the interface depicted in FIG. 1F.

Sound analysis logic 244 may analyze incoming audio from the audio input device 202. The sound analysis logic 244 may synchronize the recorded audio with the music playing in the karaoke performance, which may be used (for example) to determine whether the user is singing the correct lyrics at the correct timing. Based on the quality of the user's performance (e.g., the user's timing and pitch, and the correctness of the lyrics sung by the user), ranking logic 246 may generate an initial quality score. The quality score may be weighted and combined with a weighted engagement score (e.g., retrieved via the server 230), which indicates how much interaction other viewers have had with the user's performance. For example, if the user's performance is broadcast on a social network, the viewers may "like," share," or comment on the user's performance. These interactions may be weighted and combined to determine an engagement score.

When the quality score and the engagement score are appropriately weighted and combined, a total score may be generated and reported back to the server 230. The server may compare the total scores for multiple users (e.g., users participating in a karaoke competition), and may rank the users based on their total scores. The user's rank, as well as the ranks of other users, may be reported back to the ranking logic 246.

In order to generate a gesture-based music track, gesture logic 248 may also be provided. The gesture logic 248 may include facial detection logic 250 for detecting a location of a face in a video and/or image. The facial detection logic 250 may further identify features of the face and track the features. The facial detection logic 250 may identify an area taken up by the face and/or the features, and/or may identify points associated with the face and/or features. The facial detection logic 250 may identify an orientation of the face and/or features.

Facial tracking logic 252 may receive the areas, points, locations, etc. of the face and facial features from the facial detection logic 250. The facial tracking logic 252 may log the areas, points, locations, orientations etc. over time and/or may identify times at which the areas, points, locations, orientations, etc. change. The facial tracking logic 252 may optionally identify a degree or rate of change of the areas, points, locations, orientations, etc.

Alternatively or in addition, this functionality may be performed by the video input logic 214 and/or the operating system 218.

The information generated by the facial tracking logic 252 may be compared to one or more triggering conditions by event triggering logic 254. The triggering conditions may be stored in a database or table, or may be stored in the musical element 224. The event triggering logic may determine whether the position or change in the face or facial features triggers an event. The event may be triggered by a relative change in the face and/or facial features (e.g., raising an eyebrow), and/or may be triggered by placing the face or features in a certain position (e.g., moving the user's nose to a predetermined location or to a graphical element displayed on screen). In some cases, a different degree or rate of change may cause different events to trigger (e.g., playing notes from different instruments), or may cause an event to trigger in a different way (e.g., triggering a note from the same instrument but at a different pitch). In some embodiments, sustaining the change, position, configuration, etc. may cause the musical tone or sequence to be sustained.

Once an event is triggered, musical element logic 266 may match the triggered event to a musical tone or sequence to be played. The event may be mapped to the tone or sequence in the musical element 224, and the musical element logic 266 may retrieve the tone or sequence from the musical element 224.

Once the musical tone or sequence has been retrieved, music playback logic 258 may cause the tone or sequence to be played by the audio output device 210. Alternatively or in addition, the music playback logic 258 may record the tone or sequence to an audio track, which may optionally be synchronized with video captured by the video input device 206.

The music playback logic 258 may play back the musical tone or sequence subject to constraints from musical balancing logic 260. The musical balancing logic 260 may be configured to restrict or delay the playback of a musical tone or sequence based on balancing conditions, such as ensuring that the tone or sequence falls within a beat that is consistent with the rate at which recent musical tones have been played (or a predetermined beat). The musical balancing logic 260 may also or alternatively be configured to prevent tones or sequences from overlapping each other or otherwise occurring within a predetermined threshold period of time, in order to prevent the audio output from becoming too chaotic. The predetermined threshold period of time may be determined dynamically by the musical balancing logic, may be set based on user preferences, and/or may be stored in the musical element 224.

The application 238, memory 220, and I/O devices may communicate, through the operating system 218, with a network interface for communication on a network 228, such as the internet. The network interface 226 may be, for example, a network interface card (NIC) or other suitable hardware and/or software for managing network transmissions and receptions.

Figure 3A:
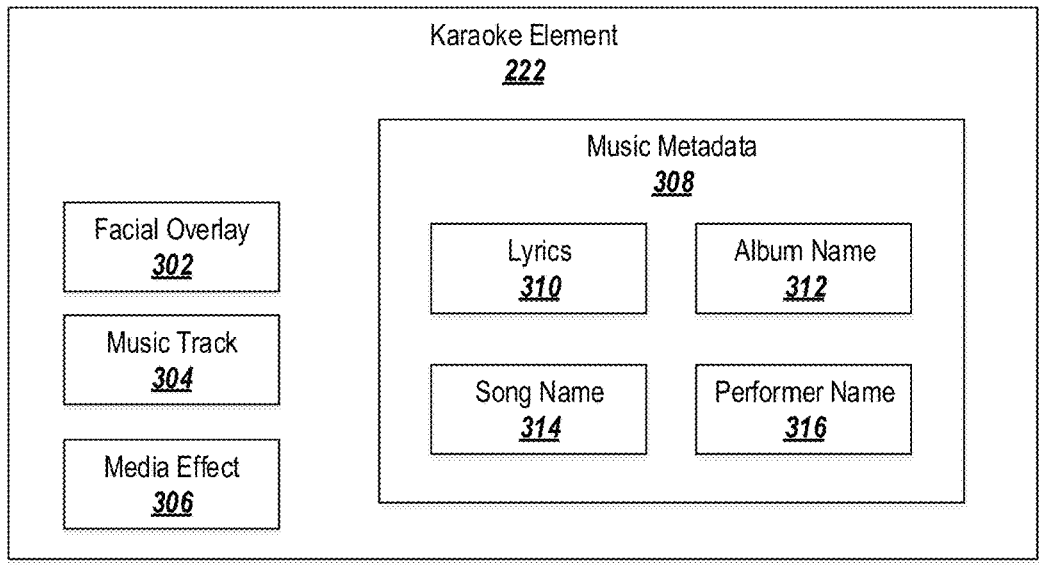
FIG. 3A depicts an exemplary data structure for a karaoke element.

The client 200 may, through the network interface 226, communicate with a corresponding network interface 232 on a server 230. The server may provide support for the karaoke logic 240 and/or the gesture logic 248. For example, the server 230 may store a karaoke element library 234, which includes multiple songs available for karaoke performances (along with associated metadata, as depicted in FIG. 3A). The server 230 may also or alternatively store a musical element library 236, including musical sequences or tones and their associated triggering conditions.

Any or all of the above-described logic may be executed via instructions on one or more hardware processors. The instructions may be stored on a physical non-transitory computer-readable storage medium.

It is noted that, although the logic and data structures are depicted in a particular configuration in FIG. 2 (with some on the client 200 and others on the server 230), other configurations are also contemplated in connection with the present invention. For example, the karaoke logic 240 and/or gesture logic 248 may reside on the server 230, which may receive a video feed from the client 200 through the network 228 and may process the video using the logic 240, 248 in order to generate a karaoke performance video and/or gesture-based music track. The output of the logic 240, 248 may be transmitted back to the original client 200 and/or to any viewers of the video/audio. Alternatively or in addition, the karaoke element library 234 and/or musical element library 236 may be stored on the client 200, or at least a portion of these libraries may be cached at the client 200.

Data Structures

FIG. 3A depicts an exemplary data structure for a karaoke element 222. The karaoke element 222 may include a facial overlay 302, such as the overlay 100 discussed in connection with FIGS. 1A-1B. The facial overlay 302 may be applied over the face of a user engaging in a karaoke performance in a video feed. The facial overlay 302 may be applied throughout the performance, or under certain conditions (e.g., when the user achieves a certain level on the leaderboard). The facial overlay 302 may represent a face of a celebrity or singer associated with the song encapsulated by the karaoke element 222. The karaoke element 222 may include multiple facial overlays (e.g., for multiple performers, or for main performers and backup singers).

The karaoke element 222 may further include a music track 304. The music track 304 may include an audio recording of a karaoke song, which may have lyrics omitted. The music track may optionally include audio data for the lyrics, which may be toggled on or off by the user (e.g., so that the user can sing along or can sing alone in the karaoke performance). The music track 304 may include synchronization markers allowing the audio to be synched with lyrics 310.

The karaoke element 222 may include one or more media effects 306. The media effects 306 may represent visual or audible additions that may be added to the audio/video of the user's karaoke performance. The media effects 306 may be coordinated with the genre or subject matter of the song (e.g., a beach ball that bounces across the screen during the performance of a surf rock song, a disco ball that descends from the top of the video for a disco song, etc.). The media effects 306 may include triggering information that causes the media effects 306 to be incorporated into the karaoke performance. For example, the media effects 306 may be invoked at a certain time during the song, when the user has sustained a certain quality of performance for a predetermined period of time, when the user rises to a certain level on the leaderboard, etc. The media effects 306 may be associated with different levels and triggers, for example becoming more ornate as the user improves their performance or ranking. The media effect 306 may optionally include a background that may be used to replace the background in the karaoke performer's video feed.

Music metadata 308 may include information associated with the song that may be used in the karaoke performance. For example, the music metadata 308 may include lyrics 310 that are displayed on the user's interface. The data for the lyrics 310 may include textual data representing the words to be sung and musical information (e.g., pitch, tone, duration, etc.) that indicate how the lyrics should be sung. The music metadata 308 may include further information, such as an album name 312, song name 314, and/or performer name 316. This metadata may be displayed on the user's or viewers' interfaces, or may be communicated upon request.

Figure 3B:
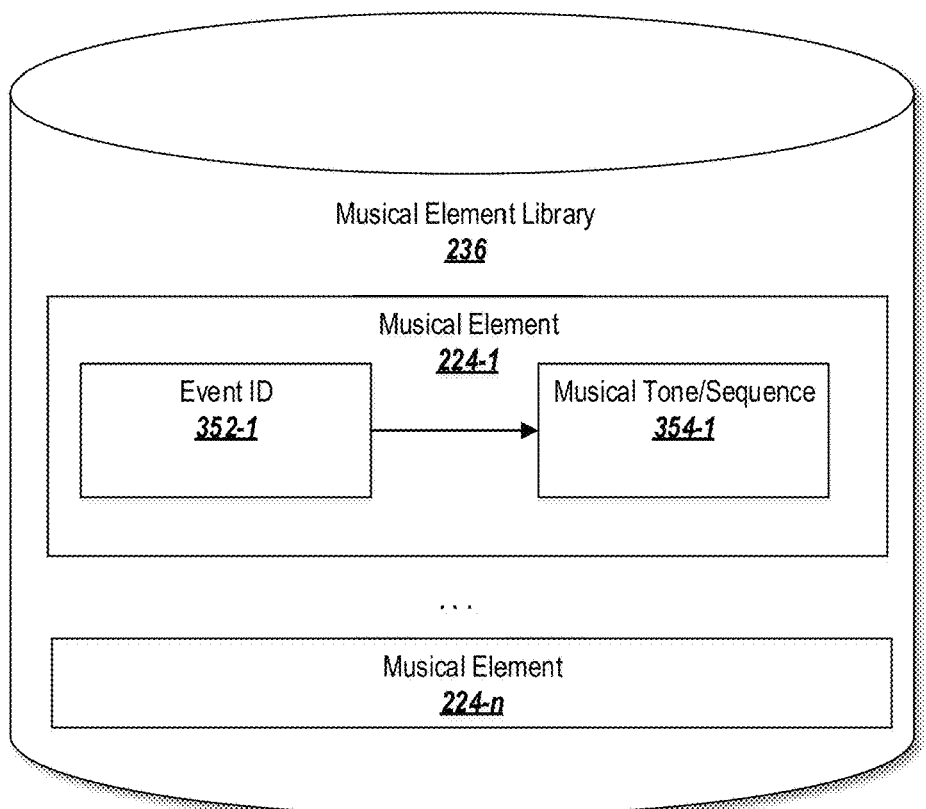
FIG. 3B depicts an exemplary data structure for an event mapping.

FIG. 3B depicts an exemplary data structure for a musical element library 236. The musical element library 236 may store musical elements 224-i, which may include an event identifier 352-i and a musical tone or sequence 354-i that may be triggered by the occurrence of an event matching the event identifier 352-i. The event identifier 352-i may correspond to a triggering condition that occurs when the user's face or facial features change or are placed in a predefined orientation, configuration, location, etc. The triggering condition may require coordination between two or more facial features (e.g., smiling while raising the user's eyebrows).

The musical tone or sequence 354-i may include a recording of audio data to be played back when the triggering condition associated with the event identifier 352-i occurs, and/or data that allows a recording to by synthesized. The musical tone or sequence 354-i may be altered by the music playback logic 254 under certain conditions (e.g., allowing the tone or sequence to be sustained or to change in pitch).

Next, exemplary methods for generating a karaoke interface and for performing music generation are described in connection with FIGS. 4A and 4B, respectively.

Exemplary Methods

Figure 4A:
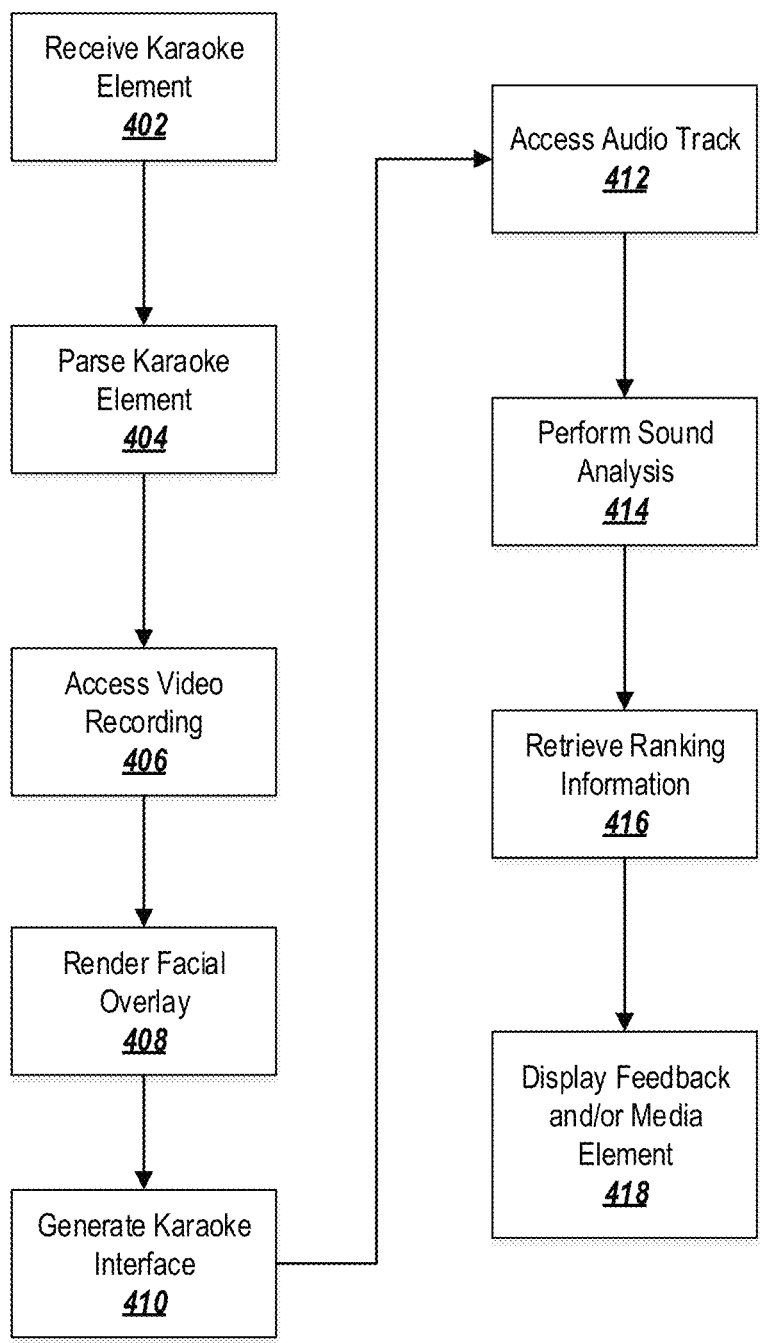
FIG. 4A is a flowchart depicting an exemplary method for processing a karaoke performance.

FIG. 4A is a flowchart depicting exemplary logic 400 for processing a karaoke performance. The logic 400 may be performed entirely at a client, entirely at a server, or in combination between a client and a server.

At block 402, the system may receive a request to initiate a karaoke performance and may retrieve a karaoke data element including the data used to process the performance. The karaoke element may be cached locally on the device or may be stored remotely. The request may originate at a client, which may be the device running the logic or a different device (with the request being received via a network interface).

At block 404, the system may parse the karaoke element to retrieve song information (e.g., audio data and lyrics), a facial overlay, and any media elements associated with the karaoke element.

At block 406, the system may access a video recording. The video may be recorded at a client device locally performing the logic, or may be recorded remotely and received (e.g., at a server) over a network interface. The video recording may include a face of a user and audio data.

At block 408, the system may draw the overlay retrieved at block 404 on the face in the video recording accessed at block 406. This operation may be performed automatically, or may occur only under certain conditions (e.g., when the quality of the user's performance or engagement levels reach a certain level, or when the user reaches a certain level on a leaderboard).

At block 410, the system may generate a karaoke interface. The karaoke interface may include the video accessed in block 406 with the overlay applied in block 408, any applicable media elements, and the lyrics of the song synchronized with the song's audio. The system may generate appropriate instructions for audio/visual output devices to render the karaoke interface so that the visual progress through the lyrics are matched to the playing of the audio.

At block 412, the system may access an audio track 412. The audio track may be an audio channel associated with the video recording accessed at block 406. The audio track may include the user's voice singing the song as directed in the karaoke interface generated in block 410.

At block 414, the system may perform a sound analysis on the audio track accessed at block 412. The system may perform audio recognition to identify words sung in the audio track, and may analyze the musical content of the singing (e.g., the pitch, tone, and duration of each sung note). The system may compare the analyzed words and musical content with the intended words and musical content (e.g., as retrieved from the karaoke element in block 404). The system may use this information to generate a quality score representing a quality of the user's performance.

At block 416, the system may retrieve ranking information that ranks the user against other users (e.g., other users who have historically performed the same song, or other users that are currently performing either the same or a different song). The ranking information may combine the above-noted quality score with an engagement score, as discussed above, to generate a total score by which the user may be ranked.

At block 418, the system may display feedback, such as the user's position on the leaderboard, triggered media elements, etc. that may vary with the user's score or ranking. In some cases, the feedback may apply to individual notes (e.g., indicating whether the user was on pitch and, if not, how far the user was off, or indicating when the user sings an incorrect word).

When the user reaches the end of the karaoke performance, processing may terminate and the user may be automatically taken to a leaderboard interface or a menu that allows the user to select another song for performance.

Figure 4B:
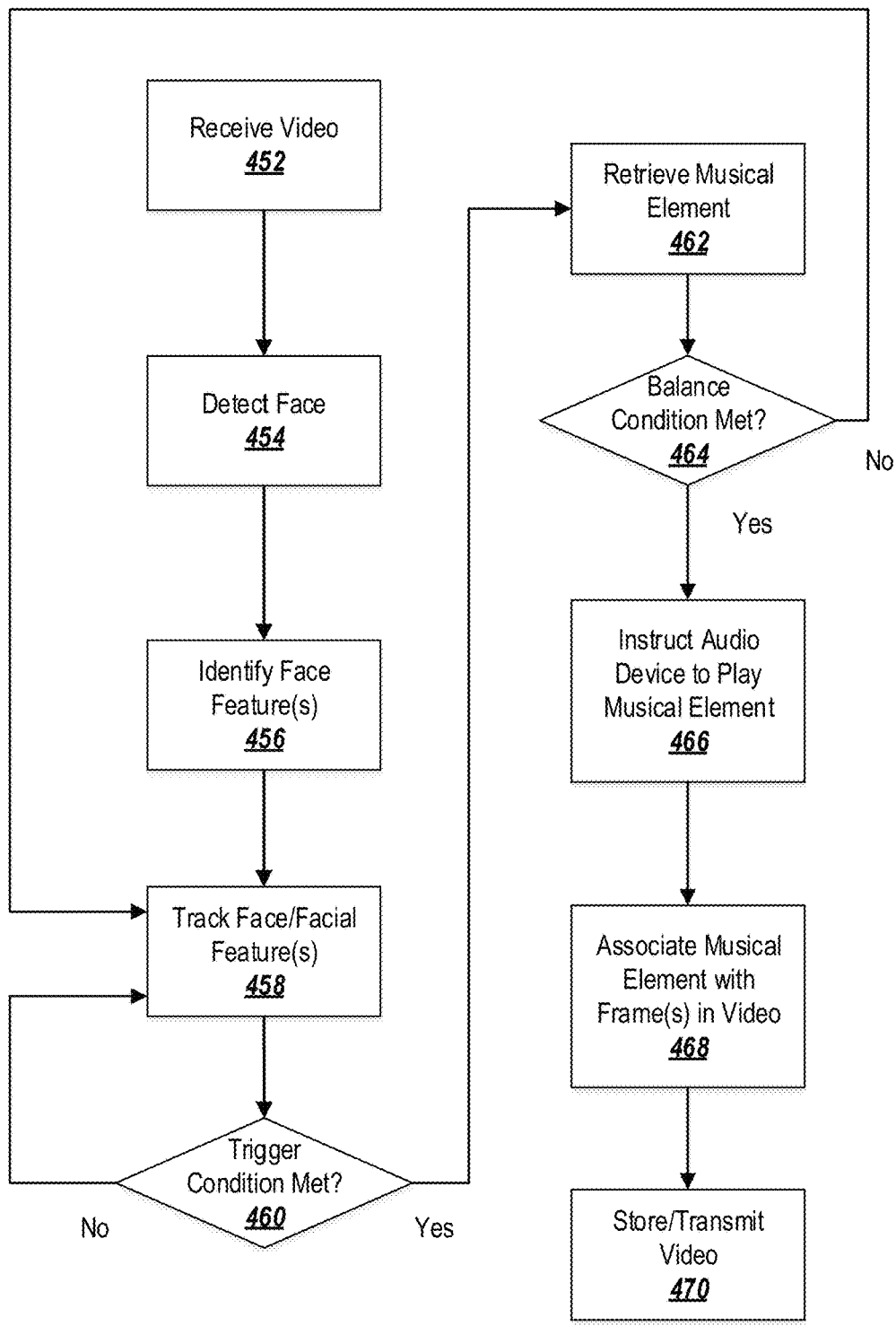
FIG. 4B is a flowchart depicting an exemplary method for generating a music track based on facial tracking.

FIG. 4B is a flowchart depicting exemplary logic 450 for generating a music track based on facial tracking.

At block 452, the system may receive a video. Block 452 generally corresponds to block 402 from FIG. 4A.

At block 454, the system may detect a face in the received video. The face may be detected by facial detection or recognition software. At block 456, the facial detection or recognition software may identify one or more features of the face. At blocks 454 and 456, various parameters (e.g., the position, orientation, area, etc.) of the face and/or facial features may be identified.

At block 458, the system may track the parameters to identify when the parameters change or achieve a predetermined value (e.g., placing a feature in a predetermined orientation). For example, the system may sample the video feed at regular intervals and note when a position of a point representing a feature, or the location of the area of the face, changes. Optionally, at block 458 the system may detect a degree and/or direction of change in the facial feature.

At block 460, the system may determine whether a change in the face or facial feature(s) (or the absolute position of the face or features) achieves a trigger condition. For example, the system may consult a database, stored musical elements, a musical element library, etc. for trigger conditions that match the change or position of the face/facial feature(s). The system may associate the triggering condition with a triggering condition identifier for lookup in the database, library, etc.

If the decision at block 460 is "no" (i.e., the trigger condition has not been met), then processing may return to block 458 and the system may continue to track facial features. If the decision at block 460 is "yes," then processing may proceed to block 462.

At block 462, the system may retrieve a musical element associated with the triggering condition. For example, the system may lookup the triggering condition identifier in a database to identify a musical element associated with the identifier. Alternatively, the system may parse musical elements in the library (ahead of time or in real time) to identify when a triggering identifier matches a musical element.

At block 464, the system may optionally determine whether a balancing condition has been met. The balancing condition may prevent a musical tone or sequence from playing outside of a given beat structure or too soon after the most recent musical tone or sequence has been played.

If the decision at block 464 is "no" (i.e., the balance condition is not met), then processing may return to block 458 and the system may continue to track facial features. This results in the triggered musical element not playing. Alternatively, the system may delay processing the triggered musical element until after the musical balancing logic indicates that it is appropriate to add a new musical element. In that case, processing may delay at block 464 before proceeding to block 466. If the decision at block 464 is "yes," then processing may proceed directly to block 466.

At block 466, the system may generate an instruction for an audio device to play a musical tone or sequence associated with the musical element retrieved at block 462. Optionally, depending on the values tracked at block 458, the system may modify the tone or sequence (e.g., for length, tone, pitch, etc.) before instructing the audio device to play it. The system may also or alternatively store the tone or sequence in an audio track for current or future playback.

At block 468, the system may associate the musical element with one or more frames in the video that triggered the musical element to be played. Accordingly, a video performance of the audio track may be generated. At block 470, the system may store the video locally or remotely, and/or may transmit the stored video to a remote location (e.g., a communication server, a social networking server, etc.).

Processing may then return to block 458 and further features may be tracked. The recording may end after a predetermined time, when predetermined conditions are met, or when ended manually (e.g., by a user).

Communication System Overview

Figure 5A:
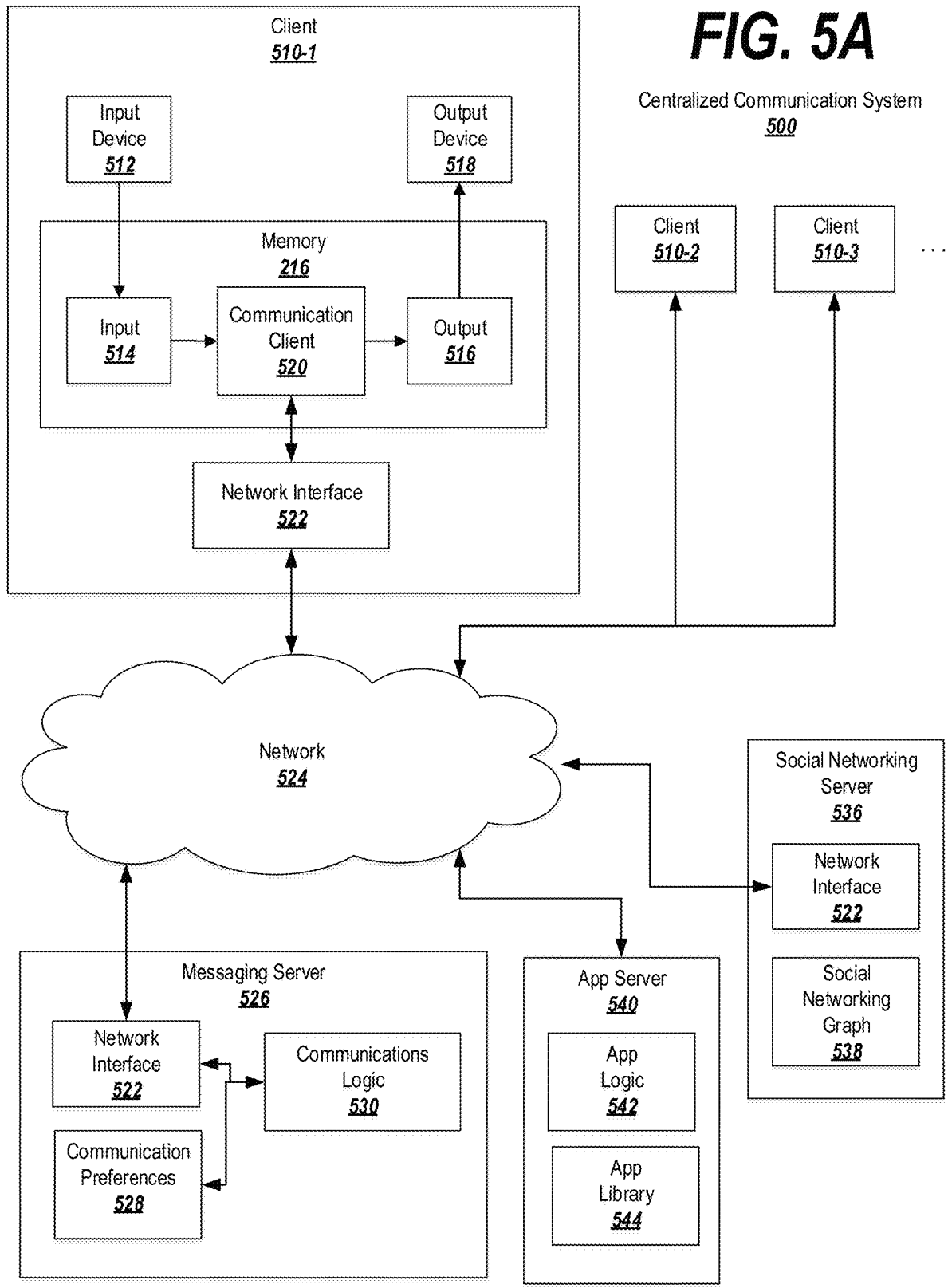
FIG. 5A is a block diagram providing an overview of a system including an exemplary centralized communications service.
Figure 5C:
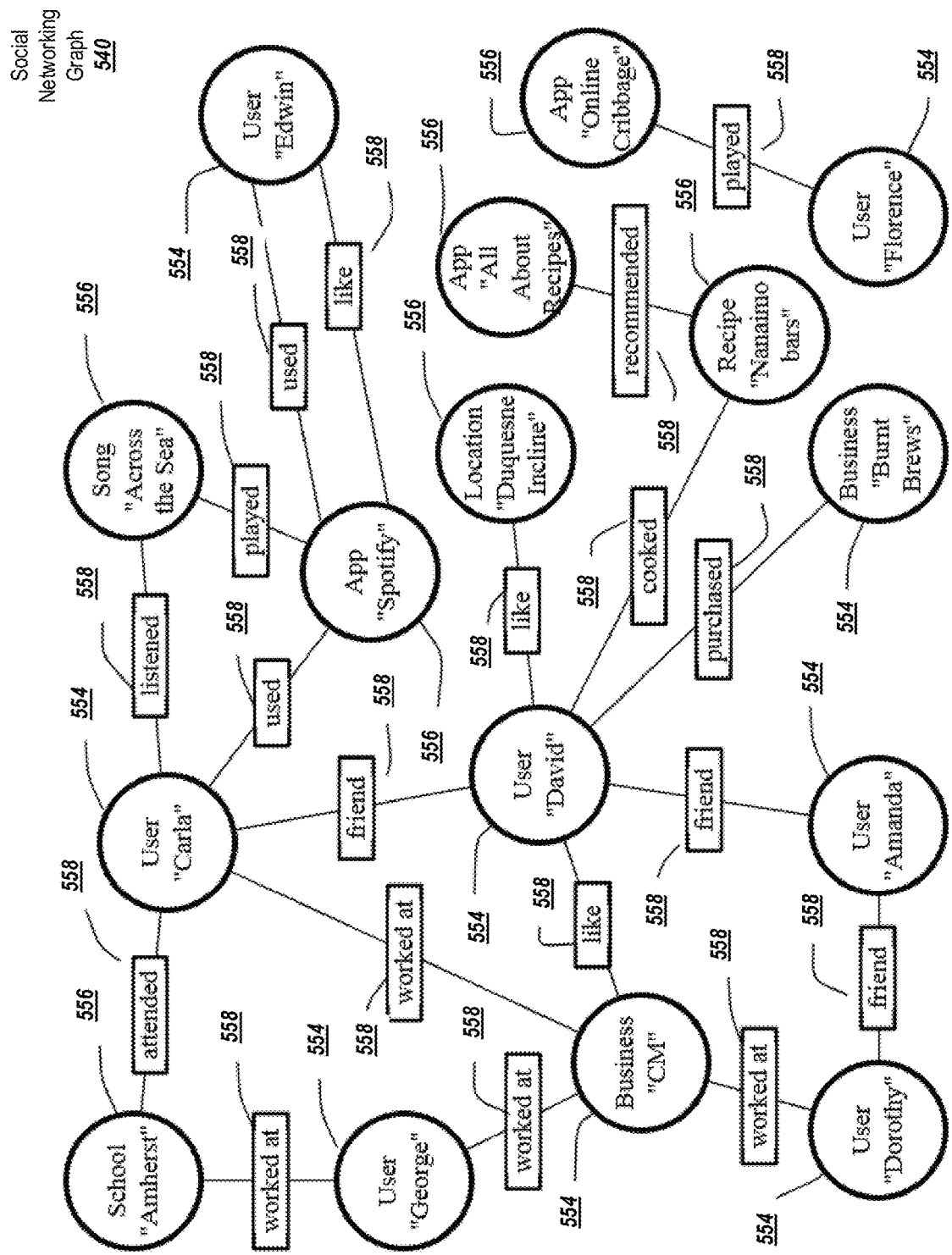
FIG. 5C depicts the social networking graph of FIGS. 5A-5B in more detail.

These examples may be implemented by a communications system that is provided either locally, at a client device, or remotely (e.g., at a remote server). FIGS. 5A-5C depict various examples of communications systems, and are discussed in more detail below.

FIG. 5A depicts an exemplary centralized communication system 500, in which functionality such as that described above is integrated into a communication server. The centralized system 500 may implement some or all of the structure and/or operations of a communication service in a single computing entity, such as entirely within a single centralized server device 526.

The communication system 500 may include a computer-implemented system having software applications that include one or more components. Although the communication system 500 shown in FIG. 5A has a limited number of elements in a certain topology, the communication system 500 may include more or fewer elements in alternate topologies.

A communication service 500 may be generally arranged to receive, store, and deliver messages. The communication service 500 may store messages or video communications while clients 520, such as may execute on client devices 510, are offline and deliver the messages/communications once the clients are available. Alternatively or in addition, the clients 520 may include social networking functionality.

A client device 510 may transmit messages addressed to a recipient user, user account, or other identifier resolving to a receiving client device 510. In exemplary embodiments, each of the client devices 510 and their respective communication clients 520 are associated with a particular user or users of the communication service 500. In some embodiments, the client devices 510 may be cellular devices such as smartphones and may be identified to the communication service 500 based on a phone number associated with each of the client devices 510. In some embodiments, each communication client may be associated with a user account registered with the communication service 500. In general, each communication client may be addressed through various techniques for the reception of messages. While in some embodiments the client devices 510 may be cellular devices, in other embodiments one or more of the client devices 510 may be personal computers, tablet devices, any other form of computing device.

The client 510 may include one or more input devices 512 and one or more output devices 518. The input devices 512 may include, for example, microphones, keyboards, cameras, electronic pens, touch screens, and other devices for receiving inputs including message data, requests, commands, user interface interactions, selections, and other types of input. The output devices 518 may include a speaker, a display device such as a monitor or touch screen, and other devices for presenting an interface to the communication system 500.

The client 510 may include a memory 519, which may be a non-transitory computer readable storage medium, such as one or a combination of a hard drive, solid state drive, flash storage, read only memory, or random access memory. The memory 519 may a representation of an input 514 and/or a representation of an output 516, as well as one or more applications. For example, the memory 519 may store a communication client 520 and/or a social networking client that allows a user to interact with a social networking service.

The input 514 may be textual, such as in the case where the input device 212 is a keyboard. Alternatively, the input 514 may be an audio recording, such as in the case where the input device 512 is a microphone. Accordingly, the input 514 may be subjected to automatic speech recognition (ASR) logic in order to transform the audio recording to text that is processable by the communication system 500. The ASR logic may be located at the client device 510 (so that the audio recording is processed locally by the client 510 and corresponding text is transmitted to the communication server 526), or may be located remotely at the communication server 526 (in which case, the audio recording may be transmitted to the communication server 526 and the communication server 526 may process the audio into text). Other combinations are also possible—for example, if the input device 512 is a touch pad or electronic pen, the input 514 may be in the form of handwriting, which may be subjected to handwriting or optical character recognition analysis logic in order to transform the input 512 into processable text.

The client 510 may be provided with a network interface 522 for communicating with a network 524, such as the Internet. The network interface 522 may transmit the input 512 in a format and/or using a protocol compatible with the network 524 and may receive a corresponding output 516 from the network 524.

The network interface 522 may communicate through the network 524 to a communication server 526. The communication server 526 may be operative to receive, store, and forward communications between clients.

The communication server 526 may include a network interface 522, communication preferences 528, and communications logic 530. The communication preferences 528 may include one or more privacy settings or other preferences for one or more users and/or message threads. Furthermore, the communication preferences 528 may include one or more settings, including default settings, for the logic described herein.

The communications logic 530 may include logic for implementing any or all of the above-described features of the present invention. Alternatively or in addition, some or all of the features may be implemented at the client 510-i, such as by being incorporated into an application such as the communication client 520.

The network interface 522 of the client 510 and/or the communication server 526 may also be used to communicate through the network 524 with an app server 540. The app server may store software or applications in an app library 544, representing software available for download by the client 510-i and/or the communication server 526 (among other entities). An app in the app library 544 may fully or partially implement the embodiments described herein. Upon receiving a request to download software incorporating exemplary embodiments, app logic 542 may identify a corresponding app in the app library 544 and may provide (e.g., via a network interface) the app to the entity that requested the software.

The network interface 522 of the client 510 and/or the communication server 526 may also be used to communicate through the network 524 with a social networking server 536. The social networking server 536 may include or may interact with a social networking graph 538 that defines connections in a social network. Furthermore, the communication server 526 may connect to the social networking server 536 for various purposes, such as retrieving connection information, communication history, event details, etc. from the social network.

A user of the client 510 may be an individual (human user), an entity (e.g., an enterprise, business, or third-party application), or a group (e.g., of individuals or entities) that interacts or communicates with or over the social networking server 536. The social-networking server 536 may be a network-addressable computing system hosting an online social network. The social networking server 536 may generate, store, receive, and send social-networking data, such as, for example, user-profile data, concept-profile data, social-graph information, or other suitable data related to the online social network. The social networking server 536 may be accessed by the other components of the network environment either directly or via the network 524.

The social networking server 536 may include an authorization server (or other suitable component(s)) that allows users to opt in to or opt out of having their actions logged by social-networking server 536 or shared with other systems (e.g., third-party systems, such as the communication server 526), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 536 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 538. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 536 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 536 may send a request to the data store for the object. The request may identify the user associated with the request. The requested data object may only be sent to the user (or a client system 510 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 536 or explicit connections of a user to a node, object, entity, brand, or page on social networking server 536. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for Soda Company?"); lightweight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 5A may be well-suited to deployment as a new system or as an upgrade to an existing system, because the logic for implementing exemplary embodiments is incorporated into the communication server 526. In contrast, FIG. 5B depicts an exemplary distributed communication system 550, in which functionality for implementing exemplary embodiments is distributed and remotely accessible from the communication server. Examples of a distributed communication system 550 include a client-server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 5B are identical to those in FIG. 5A, and a description of these elements is not repeated here for the sake of brevity (the app server 540 is omitted from the Figure for ease of discussion, although it is understood that this embodiment may also employ an app server 540). The primary difference between the centralized embodiment and the distributed embodiment is the addition of a separate processing server 552, which hosts the logic 530 for implementing exemplary embodiments. The processing server 552 may be distinct from the communication server 526 but may communicate with the communication server 526, either directly or through the network 524, to provide the functionality of the logic 530 and the logic 534 to the communication server 526.

The embodiment depicted in FIG. 5B may be particularly well suited to allow exemplary embodiments to be deployed alongside existing communication systems, for example when it is difficult or undesirable to replace an existing communication server. Additionally, in some cases the communication server 526 may have limited resources (e.g. processing or memory resources) that limit or preclude the addition of the additional pivot functionality. In such situations, the capabilities described herein may still be provided through the separate processing server 552.

In still further embodiments, the logic 532 may be provided locally at the client 510-i, for example as part of the communication client 520. In these embodiments, each client 510-i makes its own determination as to which messages belong to which thread, and how to update the display and issue notifications. As a result, different clients 510-i may display the same conversation differently, depending on local settings (for example, the same messages may be assigned to different threads, or similar threads may have different parents or highlights).

FIG. 5C illustrates an example of a social networking graph 538. In exemplary embodiments, a social networking service may store one or more social graphs 538 in one or more data stores as a social graph data structure via the social networking service.

The social graph 538 may include multiple nodes, such as user nodes 554 and concept nodes 556. The social graph 228 may furthermore include edges 558 connecting the nodes. The nodes and edges of social graph 228 may be stored as data objects, for example, in a data store (such as a social-graph database). Such a data store may include one or more searchable or queryable indexes of nodes or edges of social graph 228.

The social graph 538 may be accessed by a social-networking server 226, client system 210, third-party system (e.g., the translation server 224), or any other approved system or device for suitable applications.

A user node 554 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 554 corresponding to the user, and store the user node 30 in one or more data stores. Users and user nodes 554 described herein may, where appropriate, refer to registered users and user nodes 554 associated with registered users. In addition or as an alternative, users and user nodes 554 described herein may, where appropriate, refer to users that have not registered with the social-networking system. In particular embodiments, a user node 554 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 554 may be associated with one or more data objects corresponding to information associated with a user. In particular embodiments, a user node 554 may correspond to one or more webpages. A user node 554 may be associated with a unique user identifier for the user in the social-networking system.

In particular embodiments, a concept node 556 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 556 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 556 may be associated with one or more data objects corresponding to information associated with concept node 556. In particular embodiments, a concept node 556 may correspond to one or more webpages.

In particular embodiments, a node in social graph 538 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 556. Profile pages may be viewable by all or a selected subset of other users. As an example and not by way of limitation, a user node 554 may have a corresponding user-profile page in which the corresponding user may add content, make declarations, or otherwise express himself or herself. A business page such as business page 205 may comprise a user-profile page for a commerce entity. As another example and not by way of limitation, a concept node 556 may have a corresponding concept-profile page in which one or more users may add content, make declarations, or express themselves, particularly in relation to the concept corresponding to concept node 556.

In particular embodiments, a concept node 556 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 554 corresponding to the user and a concept node 556 corresponding to the third-party webpage or resource and store edge 558 in one or more data stores.

In particular embodiments, a pair of nodes in social graph 538 may be connected to each other by one or more edges 558. An edge 558 connecting a pair of nodes may represent a relationship between the pair of nodes. In particular embodiments, an edge 558 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 558 connecting the first user's user node 554 to the second user's user node 554 in social graph 538 and store edge 558 as social-graph information in one or more data stores. In the example of FIG. 5C, social graph 538 includes an edge 558 indicating a friend relation between user nodes 554 of user "Amanda" and user "Dorothy." Although this disclosure describes or illustrates particular edges 558 with particular attributes connecting particular user nodes 554, this disclosure contemplates any suitable edges 558 with any suitable attributes connecting user nodes 554. As an example and not by way of limitation, an edge 558 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 538 by one or more edges 558.

In particular embodiments, an edge 558 between a user node 554 and a concept node 556 may represent a particular action or activity performed by a user associated with user node 554 toward a concept associated with a concept node 556. As an example and not by way of limitation, as illustrated in FIG. 5C, a user may "like," "attended," "played," "listened," "cooked," "worked at," or "watched" a concept, each of which may correspond to a edge type or subtype. A concept-profile page corresponding to a concept node 556 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (Music Service, which is an online music application). In this case, the social-networking system may create a "listened" edge 558 and a "used" edge (as illustrated in FIG. 5C) between user nodes 554 corresponding to the user and concept nodes 556 corresponding to the song and application to indicate that the user listened to the song and used the application. Moreover, the social-networking system may create a "played" edge 558 (as illustrated in FIG. 5C) between concept nodes 556 corresponding to the song and the application to indicate that the particular song was played by the particular application. In this case, "played" edge 558 corresponds to an action performed by an external application (Music Service) on an external audio file (the song "Across the Sea"). Although this disclosure describes particular edges 558 with particular attributes connecting user nodes 554 and concept nodes 556, this disclosure contemplates any suitable edges 558 with any suitable attributes connecting user nodes 554 and concept nodes 556. Moreover, although this disclosure describes edges between a user node 554 and a concept node 556 representing a single relationship, this disclosure contemplates edges between a user node 554 and a concept node 556 representing one or more relationships. As an example and not by way of limitation, an edge 558 may represent both that a user likes and has used at a particular concept. Alternatively, another edge 558 may represent each type of relationship (or multiples of a single relationship) between a user node 554 and a concept node 556 (as illustrated in FIG. 5C between user node 554 for user "Edwin" and concept node 556 for "Music Service").

In particular embodiments, the social-networking system may create an edge 558 between a user node 554 and a concept node 556 in social graph 538. As an example and not by way of limitation, a user viewing a concept-profile page (such as, for example, by using a web browser or a special-purpose application hosted by the user's client system) may indicate that he or she likes the concept represented by the concept node 556 by clicking or selecting a "Like" icon, which may cause the user's client system to send to the social-networking system a message indicating the user's liking of the concept associated with the concept-profile page. In response to the message, the social-networking system may create an edge 558 between user node 554 associated with the user and concept node 556, as illustrated by "like" edge 558 between the user and concept node 556. In particular embodiments, the social-networking system may store an edge 558 in one or more data stores. In particular embodiments, an edge 558 may be automatically formed by the social-networking system in response to a particular user action. As an example and not by way of limitation, if a first user uploads a picture, watches a movie, or listens to a song, an edge 558 may be formed between user node 554 corresponding to the first user and concept nodes 556 corresponding to those concepts. Although this disclosure describes forming particular edges 558 in particular manners, this disclosure contemplates forming any suitable edges 558 in any suitable manner.

The social graph 538 may further comprise a plurality of product nodes. Product nodes may represent particular products that may be associated with a particular business. A business may provide a product catalog to a consumer-to-business service and the consumer-to-business service may therefore represent each of the products within the product in the social graph 538 with each product being in a distinct product node. A product node may comprise information relating to the product, such as pricing information, descriptive information, manufacturer information, availability information, and other relevant information. For example, each of the items on a menu for a restaurant may be represented within the social graph 538 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 538. The information for a product node may be manipulated by the social-networking system as a product object that encapsulates information regarding the referenced product.

As such, the social graph 538 may be used to infer shared interests, shared experiences, or other shared or common attributes of two or more users of a social-networking system. For instance, two or more users each having an edge to a common business, product, media item, institution, or other entity represented in the social graph 538 may indicate a shared relationship with that entity, which may be used to suggest customization of a use of a social-networking system, including a messaging system, for one or more users.

The embodiments described above may be performed by a messaging architecture, an example of which is next described with reference to FIG. 6.

Messaging Architecture

Figure 6:
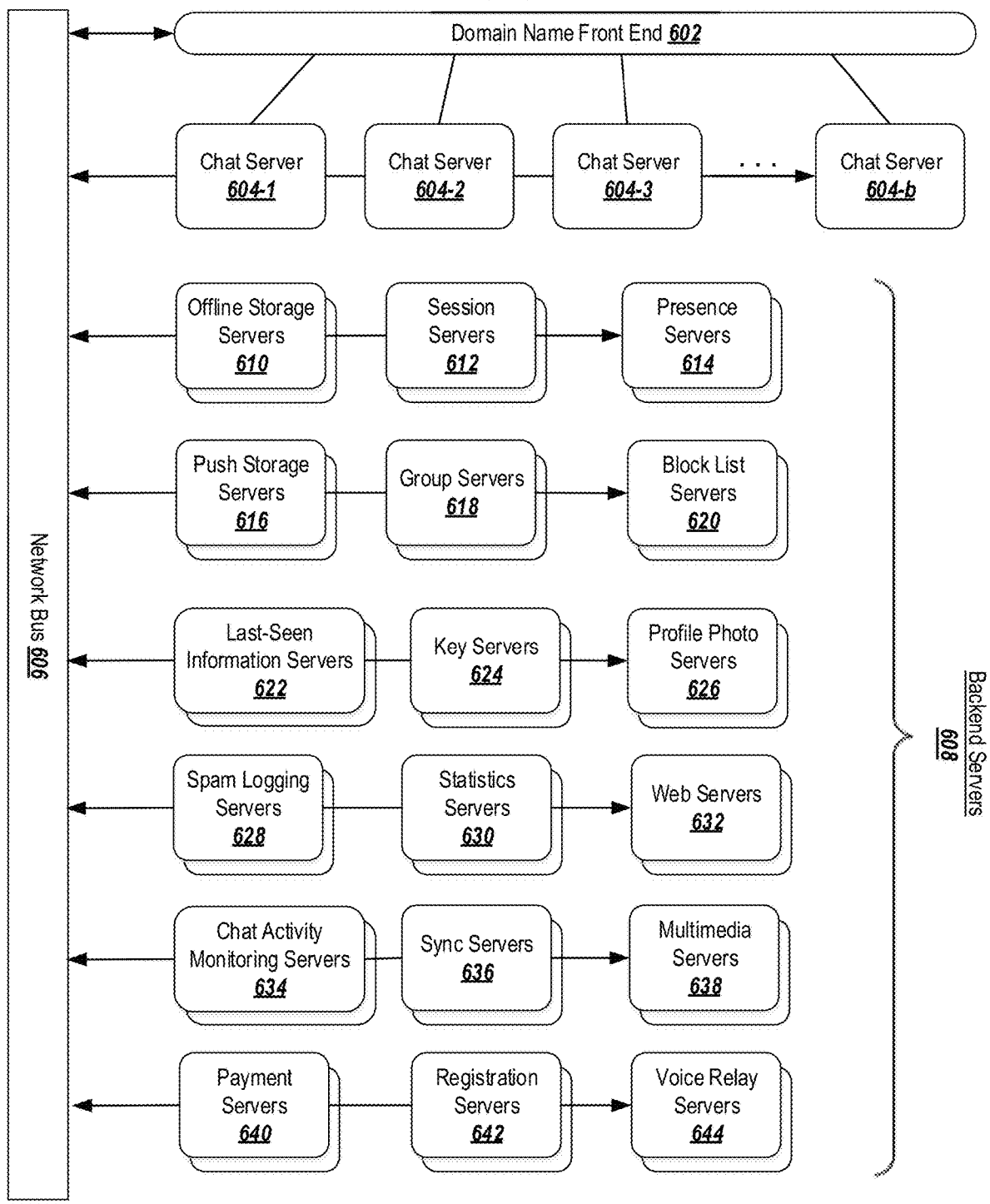
FIG. 6 is a block diagram depicting an example of a system for a messaging service.

FIG. 6 illustrates an embodiment of a plurality of servers implementing various functions of a messaging service 600. It will be appreciated that different distributions of work and functions may be used in various embodiments of a messaging service 600.

The messaging service 600 may comprise a domain name front end 602. The domain name front end 602 may be assigned one or more domain names associated with the messaging service 600 in a domain name system (DNS). The domain name front end 602 may receive incoming connections and distribute the connections to servers providing various messaging services.

The messaging service 602 may comprise one or more chat servers 604. The chat servers 604 may comprise front-end servers for receiving and transmitting user-to-user messaging updates such as chat messages. Incoming connections may be assigned to the chat servers 604 by the domain name front end 602 based on workload balancing.

The messaging service 600 may comprise backend servers 608. The backend servers 608 may perform specialized tasks in the support of the chat operations of the front-end chat servers 604. A plurality of different types of backend servers 608 may be used. It will be appreciated that the assignment of types of tasks to different backend serves 608 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 600 may comprise one or more offline storage servers 610. The one or more offline storage servers 610 may store messaging content for currently-offline messaging clients in hold for when the messaging clients reconnect.

The messaging service 600 may comprise one or more sessions servers 612. The one or more session servers 612 may maintain session state of connected messaging clients.

The messaging service 600 may comprise one or more presence servers 614. The one or more presence servers 614 may maintain presence information for the messaging service 600. Presence information may correspond to user-specific information indicating whether or not a given user has an online messaging client and is available for chatting, has an online messaging client but is currently away from it, does not have an online messaging client, and any other presence state.

The messaging service 600 may comprise one or more push storage servers 616. The one or more push storage servers 616 may cache push requests and transmit the push requests to messaging clients. Push requests may be used to wake messaging clients, to notify messaging clients that a messaging update is available, and to otherwise perform server-side-driven interactions with messaging clients.

The messaging service 600 may comprise one or more group servers 618. The one or more group servers 618 may maintain lists of groups, add users to groups, remove users from groups, and perform the reception, caching, and forwarding of group chat messages.

The messaging service 600 may comprise one or more block list servers 620. The one or more block list servers 620 may maintain user-specific block lists, the user-specific incoming-block lists indicating for each user the one or more other users that are forbidden from transmitting messages to that user. Alternatively or additionally, the one or more block list servers 620 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 600 may comprise one or more last seen information servers 622. The one or more last seen information servers 622 may receive, store, and maintain information indicating the last seen location, status, messaging client, and other elements of a user's last seen connection to the messaging service 600.

The messaging service 600 may comprise one or more key servers 624. The one or more key servers may host public keys for public/private key encrypted communication.

The messaging service 600 may comprise one or more profile photo servers 626. The one or more profile photo servers 626 may store and make available for retrieval profile photos for the plurality of users of the messaging service 600.

The messaging service 600 may comprise one or more spam logging servers 628. The one or more spam logging servers 628 may log known and suspected spam (e.g., unwanted messages, particularly those of a promotional nature). The one or more spam logging servers 628 may be operative to analyze messages to determine whether they are spam and to perform punitive measures, in some embodiments, against suspected spammers (users that send spam messages).

The messaging service 600 may comprise one or more statistics servers 630. The one or more statistics servers may compile and store statistics information related to the operation of the messaging service 600 and the behavior of the users of the messaging service 600.

The messaging service 600 may comprise one or more web servers 632. The one or more web servers 632 may engage in hypertext transport protocol (HTTP) and hypertext transport protocol secure (HTTPS) connections with web browsers.

The messaging service 600 may comprise one or more chat activity monitoring servers 634. The one or more chat activity monitoring servers 634 may monitor the chats of users to determine unauthorized or discouraged behavior by the users of the messaging service 600. The one or more chat activity monitoring servers 634 may work in cooperation with the spam logging servers 628 and block list servers 620, with the one or more chat activity monitoring servers 634 identifying spam or other discouraged behavior and providing spam information to the spam logging servers 628 and blocking information, where appropriate to the block list servers 620.

The messaging service 600 may comprise one or more sync servers 636. The one or more sync servers 636 may sync the messaging system 500 with contact information from a messaging client, such as an address book on a mobile phone, to determine contacts for a user in the messaging service 600.

The messaging service 600 may comprise one or more multimedia servers 638. The one or more multimedia servers may store multimedia (e.g., images, video, audio) in transit between messaging clients, multimedia cached for offline endpoints, and may perform transcoding of multimedia.

The messaging service 600 may comprise one or more payment servers 640. The one or more payment servers 640 may process payments from users. The one or more payment servers 640 may connect to external third-party servers for the performance of payments.

The messaging service 600 may comprise one or more registration servers 642. The one or more registration servers 642 may register new users of the messaging service 600.

The messaging service 600 may comprise one or more voice relay servers 644. The one or more voice relay servers 644 may relay voice-over-Internet-protocol (VoIP) voice communication between messaging clients for the performance of VoIP calls.

Figure 7:
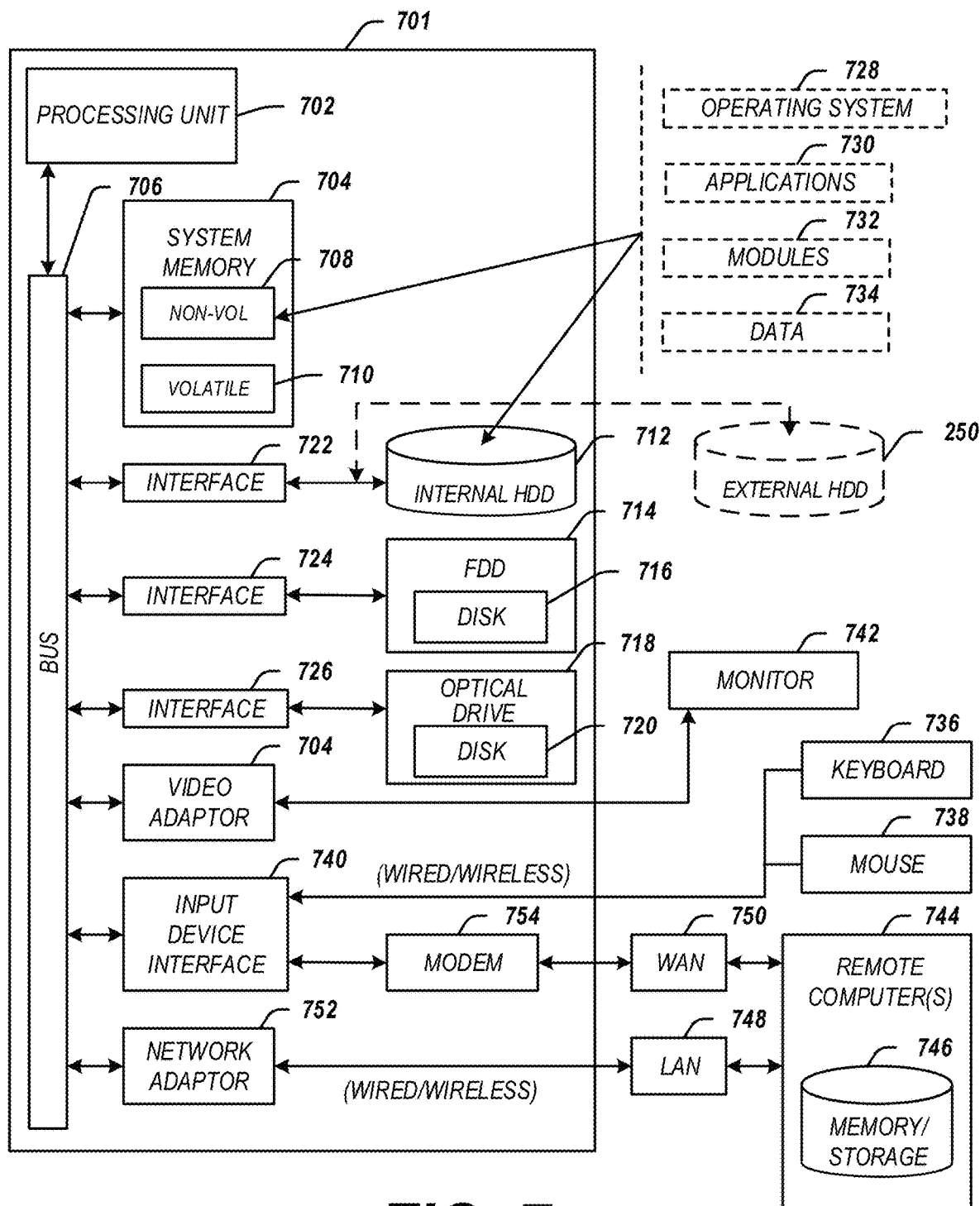
FIG. 7 is a block diagram illustrating an exemplary computing device suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an Athlon®, Duron® and Opteron® processors; embedded and secure processors; DragonBall® and PowerPC® processors; Cell processors; Celeron®, Core (2) Duo®, Itanium®, Pentium®, Xeon®, and XScale® processors; and similar processors. Dual microprocessors, multi-core processors, and other multi-processor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the messaging system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
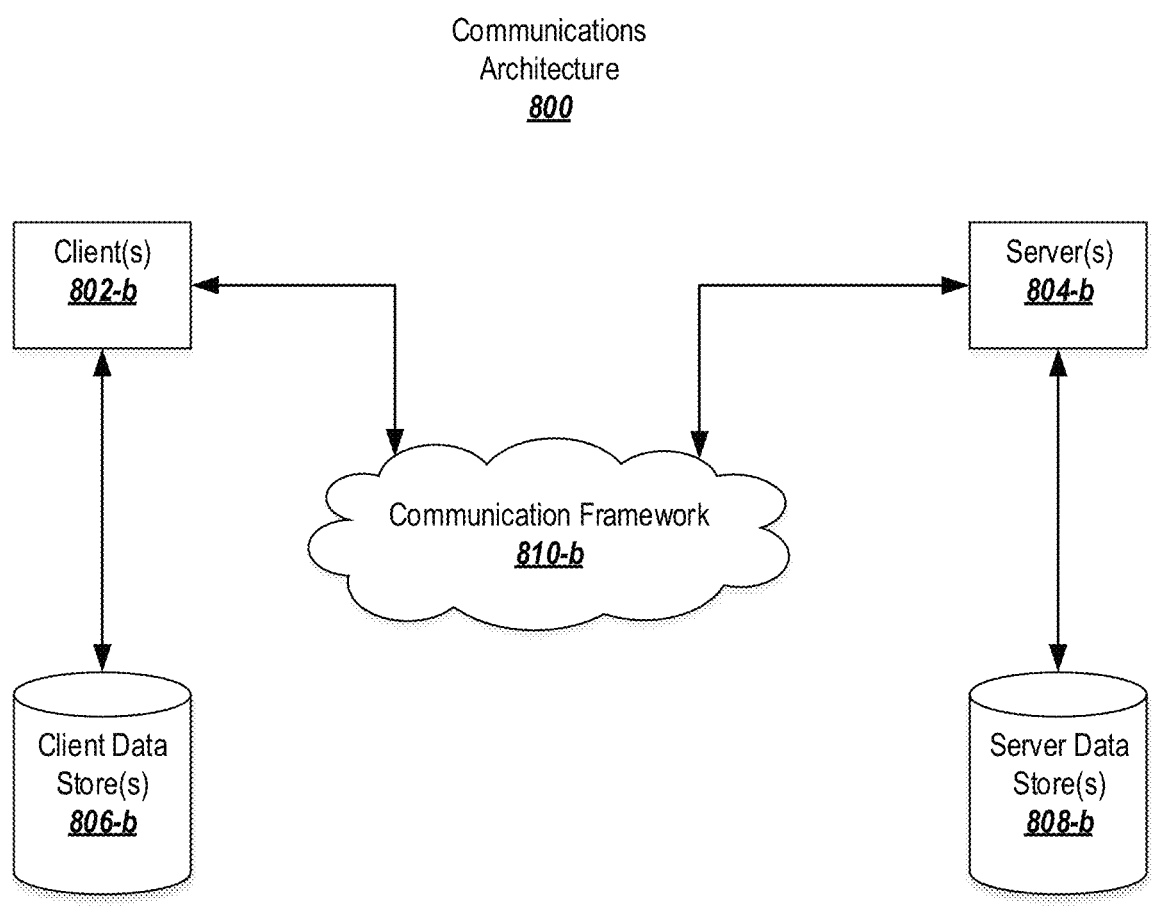
FIG. 8 depicts an exemplary communication architecture.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device 510. The servers 804 may implement the server device 526. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 9:
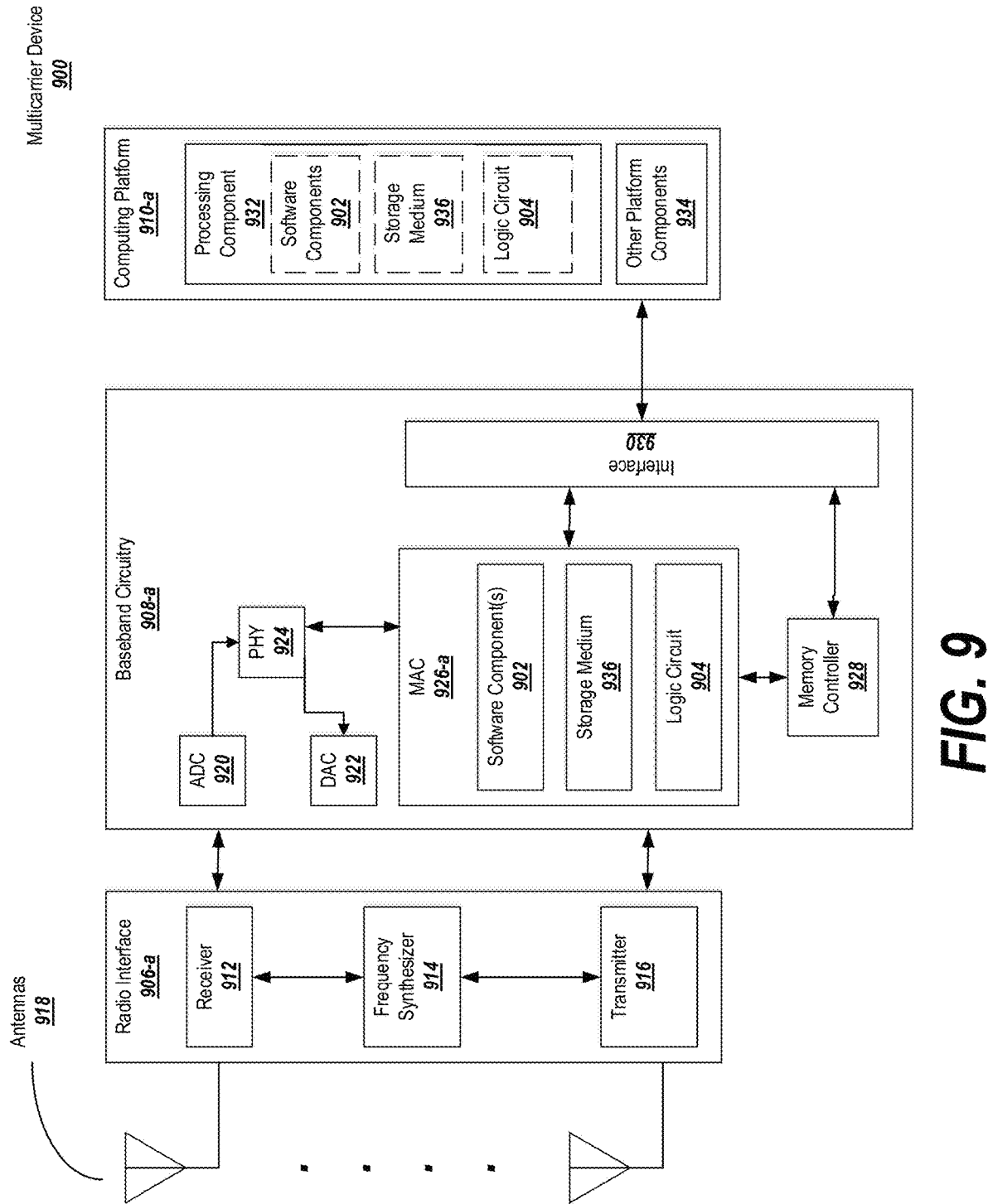
FIG. 9 is a block diagram depicting an exemplary multicarrier communications device.

FIG. 9 illustrates an embodiment of a device 900 for use in a multicarrier OFDM system, such as the messaging system 500. The device 900 may implement, for example, software components 902 as described with reference to the messaging component logic 600, the intent determination logic 700, and the group selection logic 800. The device 900 may also implement a logic circuit 904. The logic circuit 904 may include physical circuits to perform operations described for the messaging system 600. As shown in FIG. 9, device 900 may include a radio interface 906, baseband circuitry 908, and a computing platform 910, although embodiments are not limited to this configuration.

The device 900 may implement some or all of the structure and/or operations for the messaging system 500 and/or logic circuit 904 in a single computing entity, such as entirely within a single device. Alternatively, the device 900 may distribute portions of the structure and/or operations for the messaging system 600 and/or logic circuit 904 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 906 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 906 may include, for example, a receiver 912, a transmitter 914 and/or a frequency synthesizer 916. The radio interface 906 may include bias controls, a crystal oscillator and/or one or more antennas 918. In another embodiment, the radio interface 906 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 908 may communicate with the radio interface 906 to process receive and/or transmit signals and may include, for example, an analog-to-digital converter 920 for down converting received signals, and a digital-to-analog converter 922 for up-converting signals for transmission. Further, the baseband circuitry 908 may include a baseband or physical layer (PHY) processing circuit 924 for PHY link layer processing of respective receive/transmit signals. The baseband circuitry 908 may include, for example, a processing circuit 926 for medium access control (MAC)/data link layer processing. The baseband circuitry 908 may include a memory controller 928 for communicating with the processing circuit 926 and/or a computing platform 910, for example, via one or more interfaces 930.

In some embodiments, the PHY processing circuit 924 may include a frame construction and/or detection module, in combination with additional circuitry such as a buffer memory, to construct and/or deconstruct communication frames, such as radio frames. Alternatively or in addition, the MAC processing circuit 926 may share processing for certain of these functions or perform these processes independent of the PHY processing circuit 924. In some embodiments, MAC and PHY processing may be integrated into a single circuit.

The computing platform 910 may provide computing functionality for the device 900. As shown, the computing platform 910 may include a processing component 932. In addition to, or alternatively of, the baseband circuitry 908, the device 900 may execute processing operations or logic for the messaging system 500 and logic circuit 904 using the processing component 932. The processing component 932 (and/or the PHY 924 and/or MAC 926) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 910 may further include other platform components 934. Other platform components 934 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 900 described herein, may be included or omitted in various embodiments of the device 900, as suitably desired. In some embodiments, the device 900 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 900 may be implemented using single input single output (SISO) architectures. However, certain implementations may include multiple antennas (e.g., antennas 918) for transmission and/or reception using adaptive antenna techniques for beamforming or spatial division multiple access (SDMA) and/or using MIMO communication techniques.

The components and features of the device 900 may be implemented using any combination of discrete circuitry, application specific integrated circuits (ASICs), logic gates and/or single chip architectures. Further, the features of the device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 936 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
   receiving a recording of one or more frames comprising a face;
   detecting the face in the one or more frames;
   tracking one or more of the face or a feature of the face in the one or more frames;
   determining that the tracked face or the tracked feature triggers a first event;
   retrieving a first musical element associated with the first event;
   instructing an audio output device to play the first musical element;
   determining that the tracked face or the tracked feature triggers a second event associated with a second musical element;
   accessing musical balancing information that identifies whether playing the second musical element in succession with the first musical event results in a balanced musical track; and
   refraining from playing the second musical element based on an analysis of the musical balancing information.

2. The method of claim 1, wherein the event is triggered in response to a change in the face or a change in the feature of the face.

3. The method of claim 1, wherein the feature of the face comprises a location of a mouth, a an orientation of one or more eyes, a blinking or winking status of the face, or an orientation of one or more eyebrows.

4. The method of claim 1, wherein tracking the face comprises tracking a location of the face in two-dimensional or three-dimensional space, or tracking movement of the face.

5. The method of claim 1, wherein tracking the face comprises tracking one or more of an expression of the face or an emotion expressed by the face.

6. The method of claim 1, further comprising:
   associating the first musical element with the one or more frames in a video recording; and
   storing or transmitting the video recording.

7. A non-transitory computer-readable medium storing instructions configured to cause one or more processors to:
   receive a recording of one or more frames comprising a face;
   detect the face in the one or more frames;
   track one or more of the face or a feature of the face in the one or more frames;
   determine that the tracked face or the tracked feature triggers a first event;
   retrieve a first musical element associated with the first event;
   instruct an audio output device to play the first musical element;
   determine that the tracked face or the tracked feature triggers a second event associated with a second musical element;
   access musical balancing information that identifies whether playing the second musical element in succession with the first musical event results in a balanced musical track; and
   refrain from playing the second musical element based on an analysis of the musical balancing information.

8. The medium of claim 7, wherein the event is triggered in response to a change in the face or a change in the feature of the face.

9. The medium of claim 7, wherein the feature of the face comprises a location of a mouth, a an orientation of one or more eyes, a blinking or winking status of the face, or an orientation of one or more eyebrows.

10. The medium of claim 7, wherein tracking the face comprises tracking a location of the face in two-dimensional or three-dimensional space, or tracking movement of the face.

11. The medium of claim 7, wherein tracking the face comprises tracking one or more of an expression of the face or an emotion expressed by the face.

12. The medium of claim 7, further storing instructions configured to cause the one or more processors to:
    associate the first musical element with the one or more frames in a video recording; and
    store or transmit the video recording.

13. An apparatus comprising:
    a non-transitory computer readable medium storing a musical element library storing mappings of events to musical elements;
    a processor circuit;
    video input logic operable on the processor circuit and configured to retrieve a recording of one or more frames comprising a face;
    facial detection logic operable on the processor circuit and configured to detect the face in the one or more frames;
    facial tracking logic operable on the processor circuit and configured to track one or more of the face or a feature of the face in the one or more frames;
    event triggering logic operable on the processor circuit and configured to determine that the tracked face or the tracked feature triggers a first event;
    musical element logic operable on the processor circuit and configured to retrieve a first musical element associated with the first event from the musical element library; and
    music playback logic operable on the processor circuit and configured to instruct an audio output device to play the first musical element.

14. The apparatus of claim 13, wherein the event is triggered in response to a change in the face or a change in the feature of the face.

15. The apparatus of claim 13, wherein the feature of the face comprises a location of a mouth, a an orientation of one or more eyes, a blinking or winking status of the face, or an orientation of one or more eyebrows.

16. The apparatus of claim 13, wherein tracking the face comprises tracking a location of the face in two-dimensional or three-dimensional space, or tracking movement of the face.

17. The apparatus of claim 13, wherein tracking the face comprises tracking one or more of an expression of the face or an emotion expressed by the face.

18. The apparatus of claim 13, wherein the event triggering logic is further configured to determine that the tracked face or the tracked feature triggers a second event associated with a second musical element, and further comprising musical balancing logic operable on the processor circuit and configured to access musical balancing information that identifies whether playing the second musical element in succession with the first musical event results in a balanced musical track, wherein the music playback logic is configured to refrain from playing the second musical element based on an analysis of the musical balancing information.

* * * * *